US012755354B2

(12) United States Patent
Meder et al.

(10) Patent No.: US 12,755,354 B2
(45) Date of Patent: Oct. 6, 2026

(54) ANTIALIASING ENGINE(S) FOR DISTRIBUTED MORPHOLOGICAL ANTIALIASING RECONSTRUCTION

(71) Applicant: Microsoft Technology Licensing, LLC, Redmond, WA (US)

(72) Inventors: Julian Sebastian Meder, Eningen unter Achalm (DE); Florian Born, Hamburg (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 125 days.

(21) Appl. No.: 18/947,445

(22) Filed: Nov. 14, 2024

(65) Prior Publication Data

US 2026/0134520 A1 May 14, 2026

(51) Int. Cl.
*G06T 5/73* (2024.01)
*G06T 5/50* (2006.01)
*G06T 7/13* (2017.01)

(52) U.S. Cl.
CPC .................. *G06T 5/73* (2024.01); *G06T 5/50* (2013.01); *G06T 7/13* (2017.01); *G06T 2207/10016* (2013.01); *G06T 2207/20221* (2013.01)

(58) Field of Classification Search
CPC .... G06T 5/73; G06T 5/50; G06T 7/13; G06T 2207/10016; G06T 2207/20221; G06T 7/10; G06T 7/12
See application file for complete search history.

(56) References Cited

U.S. PATENT DOCUMENTS 8,019,171 B2 9/2011 Sun
2024/0112311 A1* 4/2024 Beaumont ............. G06T 15/005
2025/0157126 A1* 5/2025 Zhang ..................... G06T 15/06

OTHER PUBLICATIONS

International Search Report and Written Opinion received for PCT Application No. PCT/US2025/037993, Oct. 31, 2025, 13 pages.
Lau, Rynson W H, "An Efficient Low-cost Antialiasing Method Based on Adaptive Postfiltering", IEEE Transactions on circuits and systems for video technology, vol. 13, No. 3, Mar. 1, 2003, pp. 247-256.

* cited by examiner

*Primary Examiner* — Daniel F Hajnik
*Assistant Examiner* — Hyorim Park

(57) ABSTRACT

Systems and methods provide an antialiasing engine and its related functions that distribute the computational effort and image reconstruction functions to achieve higher visual quality using morphological methods and operations. For example, an antialiasing engine detects one or more edges within a first frame and generates an edge image indicating a respective pixel's proximity to the foreground or the background based on detection of the one or more edges within the first frame. The antialiasing engine then generates an analytical edge by tracing the edge image and encodes the analytical edge into a depth frame within a video stream. The video stream is then transmitted to a client device where the analytical edge is responsively decoded by a client-side antialiasing engine and sampled to generate a final composition integrating the first frame into a second frame using the analytical edge, where the second frame is generated by the client device.

20 Claims, 12 Drawing Sheets

410

Edge Image

Depth Image

ANTIALIASING ENGINE(S) FOR DISTRIBUTED MORPHOLOGICAL ANTIALIASING RECONSTRUCTION

TECHNICAL FIELD

Aspects of the disclosure are related to the field of computer software applications and services and, in particular, to antialiasing engines for performing one or more edge-aware antialiasing techniques that distribute the computational effort and image reconstruction to achieve higher visual quality using morphological methods and operations.

BACKGROUND

As visual quality and complexity in computer applications such as gaming, augmented reality (AR), virtual reality (VR), and mixed reality (MR) continue to advance, local devices often struggle to meet the growing processing demands. Modern consumer-grade hardware, like laptops, tablets, and smartphones, typically lack the computational power necessary to render high-fidelity graphics, intricate lighting effects, and real-time physics simulations while maintaining smooth performance. As a result, many applications are increasingly relying on hybrid or distributed rendering techniques to overcome these limitations, allowing advanced content to be experienced on less powerful devices.

In hybrid rendering, the most resource-intensive tasks—such as ray tracing, high-resolution texture mapping, and complex simulations—are offloaded to remote servers or cloud-based systems. Meanwhile, the local device handles lighter weight tasks like scene composition and user input processing. This distributed approach enables real-time rendering of visually complex content without requiring high-end hardware, making it more accessible to a wide range of devices. However, such a system presents challenges, particularly when content rendered remotely is composited over a locally rendered background. Achieving seamless transitions at the edges, where the remote content meets the background, can be difficult. Lighting discrepancies, color mismatches, and/or alignment issues can result in visual artifacts, such as harsh edges or halo effects, which disrupt the immersive experience.

These edge-related challenges are especially significant in dynamic environments like AR and MR, where precise spatial alignment and real-time interaction are crucial. Ensuring that lighting, shadows, and reflections from the remotely rendered content align perfectly or substantially with the locally rendered scene requires advanced algorithms and fine-tuned calibration. Additionally, latency between server-side rendering and local display can exacerbate these issues, leading to misalignment or delayed updates. As those skilled in the art readily appreciate, edge misalignment, fringing, jaggy edges, or unstable silhouettes can significantly undermine the visual quality and realism of the rendered content. These artifacts can be distracting, breaking the immersion for users by drawing attention to the unnatural separation between the remotely rendered content and the local background, leading to a less seamless and less convincing experience.

Accordingly, there is a need for an antialiasing engine, and its related functions, for providing distributed morphological techniques for generating smooth edges within hybrid systems. As will be expanded on below, the antialiasing engine provides various morphological techniques for performing one or more antialiasing operations remotely that provide smoother edges in final compositions over current techniques.

SUMMARY

Technology disclosed herein includes software applications and services that provide an antialiasing engine for generating smooth and visually pleasing edges without impacting the bandwidth required for transmitting a video stream or the processing requirements of local devices. In an example, an antialiasing engine may be remotely executed from a client device, such as by an application service. The client device may be in operable communication with the application service to perform one or more hybrid rendering processes, such as generating content for an AR, VR, or MR experience. As such, the application service may generate remote content. The remote content may contain a first frame having a foreground and background.

Responsive to generation of the first frame, the antialiasing engine may detect one or more edges present within the first frame. These edges may be silhouette edges or they may be interior edges. From the detected edges, the antialiasing engine may generate an edge image indicating a respective pixel's proximity to the foreground or background within the first frame. Based on the edge image, the antialiasing engine may generate an analytical edge by tracing the edge image. Once the analytical edge is computed, the antialiasing engine may encode the analytical edge into a video stream. In some cases, the antialiasing engine may encode edge information based on the analytical edge into a depth frame of the video stream and transmit the video stream to the client device.

Responsive to receiving the video stream, a client-side antialiasing engine may decode the analytical edge from the depth frame and generate coverage samples based on the analytical edge. Based on the analytical edge, the remotely generated first frame may be integrated with locally generated content to render a final composition. The final composition may be displayed via the client device to an end user.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
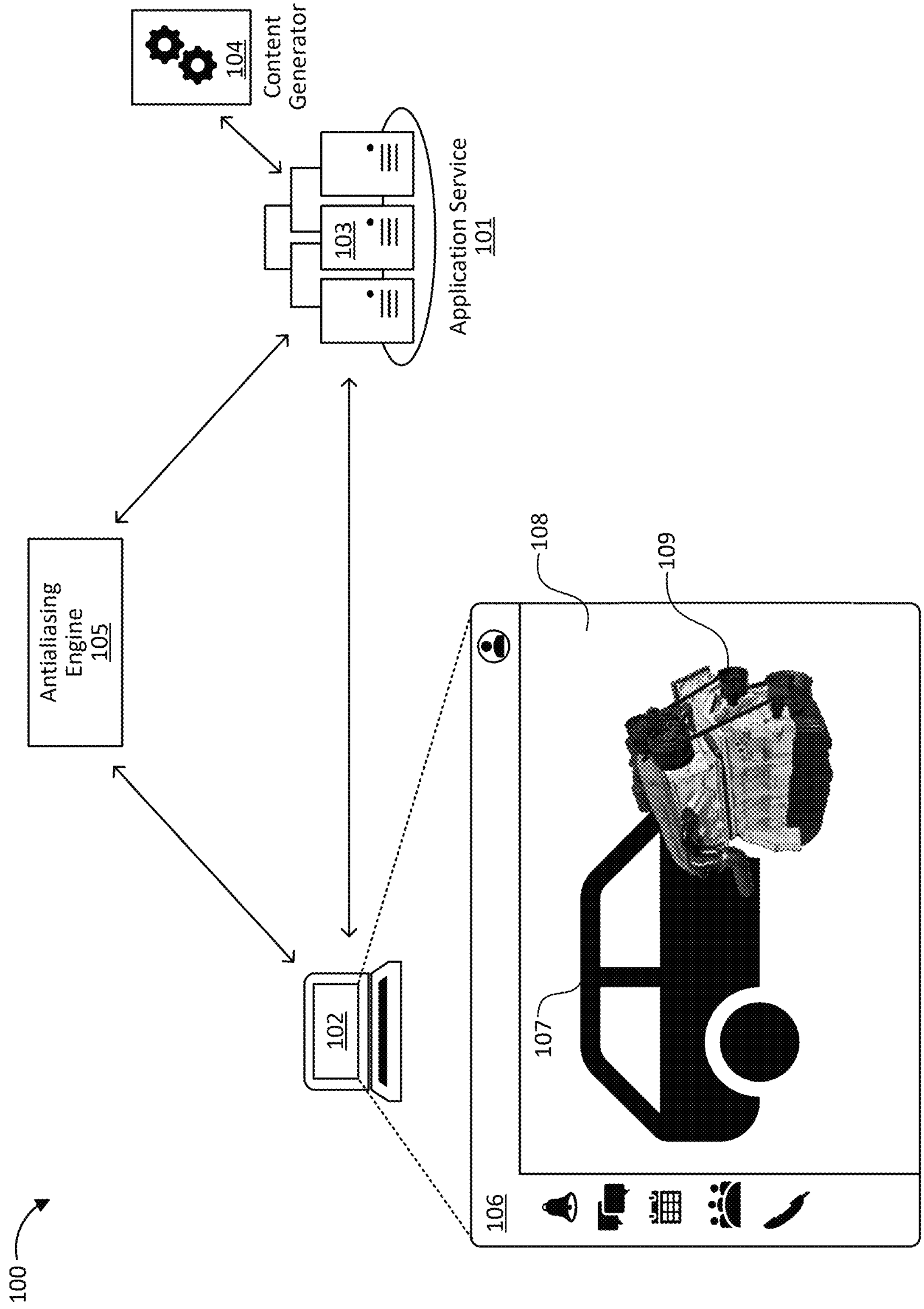
FIG. 1 illustrates an operational environment for providing an antialiasing engine, according to an embodiment herein.

In recent years, hybrid rendering has become a key technology in the virtual reality (VR), mixed reality (MR), and augmented reality (AR) spaces, enabling thin-client and low-powered end-user devices to achieve image fidelity beyond their native processing capabilities. Under hybrid rendering models, the final images displayed via a client device to the user are neither entirely computed locally nor fully cloud-streamed. Instead, hybrid rendering adopts a distributed approach, where both a local client application and a remote server share the rendering workload. The client device typically handles low-workload tasks, such as heads-up displays (HUDs) or simple local scenes, referred to as local content, while the remote server manages more computationally demanding parts of the scene, known as remote content.

The server-generated content is typically real-time encoded into a video stream and sent to the client device, where the encoding is decoded and then composed with the client device's locally rendered frame to produce the final image. This process relies on depth-based composition, which is standard in rasterization-based computer graphics. To achieve this, the server must provide not only the color frame but also an additional depth frame, which correlates with the color data, allowing for proper alignment and composition of the remote and local content in real time. Hybrid rendering techniques allow MR and AR applications to deliver high-quality visuals while offloading intensive tasks from the local device, ensuring performance and fidelity across a range of hardware.

A major challenge with current hybrid rendering techniques lies in seamlessly incorporating remotely generated content within the locally generated content in real time. One of the most difficult aspects of this process is managing the edges where the remote content meets the local content, as these transitions are particularly prone to visual artifacts. Misalignments, aliasing, or inconsistent lighting between the two content sources can result in noticeable issues at the boundaries, such as jagged edges, fringing, or visible seams. These artifacts can disrupt the visual cohesion of the scene, breaking the immersion for the user and diminishing the overall experience. Achieving smooth, natural integration at these edges requires precise depth-based composition and continuous synchronization between the client and server to ensure that the remote and local frames blend seamlessly into one unified image.

While several techniques have been developed to mitigate visual artifacts, particularly at the edges where remote and local content intersect, while maintaining low latency and client processing requirements, each of these approaches faces significant limitations that prevent them from fully addressing the core challenges of hybrid rendering as described in turn below. Techniques such as sub-color-resolution depth, full-resolution depth, masking, and post-processing each offer partial solutions but come with trade-offs that compromise either visual quality or real-time performance. As a result, none of these methods fully resolve the challenges of seamlessly integrating remote and local content in MR, AR, and/or VR environments, leaving the issue of achieving smooth, cohesive compositions an ongoing challenge in hybrid rendering.

One current technique is a sub-color-resolution depth approach which is designed to reduce bandwidth usage by transmitting a lower-resolution depth buffer from the server to the client. While this saves bandwidth, it also severely compromises the accuracy of the depth-based composition. The reduced resolution results in poor precision at the boundaries where remote and local content intersect, leading to visual artifacts such as jagged edges and shimmering. The lack of fine detail in the depth buffer causes depth misalignment, especially during dynamic scenes, breaking the illusion of immersion. As a result, while sub-color-resolution depth may improve transmission efficiency, it fails to maintain the visual quality necessary for a cohesive MR, AR, or VR experience, especially in complex or fast-moving environments.

Another current technique is a full-resolution depth approach which attempts to address the precision problem by matching the depth buffer's resolution with the color frame, improving the accuracy of depth-based composition. However, even at full resolution, conventional hybrid rendering still faces significant issues. The most prominent problem is the introduction of compression artifacts, as depth data is streamed using lossy video codecs. These artifacts can distort the depth information, resulting in temporal instability and inconsistencies in how objects are rendered from frame to frame. Even in an ideal scenario where the depth buffer is transmitted losslessly, aliasing-particularly along object edges-remains a pervasive issue. The constant movement inherent in MR/AR/VR environments, such as head tracking in head-mounted displays, amplifies these artifacts, causing distracting visual anomalies that undermine the immersive experience.

Current techniques also include a variety of masking approaches which offer a potential solution to the resolution and compression issues by sending a binary foreground-background mask, which is more bandwidth-efficient than a full-depth frame. While this method can improve edge definition and reduce some visual inconsistencies, it introduces its own limitations. The binary nature of the mask means it lacks the depth granularity required to handle complex scenes with multiple layers of foreground content. This results in perceptual errors when local and remote content intersect within the same depth region. Additionally, masking does little to address the aliasing problem, as the mask resolution would need to be significantly higher than the color and depth frames to truly eliminate edge artifacts, which is often impractical due to bandwidth constraints. The inability of masking to handle detailed depth information or complex intersections limits its effectiveness in producing high-quality, seamless compositions in hybrid rendering.

Lastly, post-processing on the client can be used to address some of these challenges, particularly with respect to aliasing and edge artifacts. However, this approach comes with notable downsides. Post-processing techniques, such as temporal antialiasing or morphological filtering, require additional processing power and memory access on the client device, which may already be limited in thin-client scenarios. Moreover, these techniques often require supplementary data, such as motion vectors, which further increases the computational burden. While post-processing can improve the final output, it introduces latency and performance trade-offs that can negatively impact the real-time responsiveness of the experience. Furthermore, post-processing is inherently limited by the quality of the incoming data-if the depth buffer or color frame has already been compromised by compression or resolution limitations, post-processing may not fully correct the artifacts, resulting in only marginal improvements to the final composition.

To address at least these challenges faced by the ever-increasing power and resource intensity of content generation, an example antialiasing engine and related functions are provided herein. As will be described in greater detail below, the antialiasing engine may perform one or more morphological antialiasing techniques in a distributed framework, thereby offloading processing-intensive steps to one or more remote servers. For example, a server-side antialiasing engine may detect one or more edges of content generated remotely. Based on the detection of the edges, the antialiasing engine may generate an edge image which indicates a respective pixel's proximity to the edge. Then, based on the edge image, the antialiasing technique may generate an analytical edge. The analytical edge may be encoded into a video stream and transmitted to the client device.

As noted above, these steps may be performed by an instance of the antialiasing engine executed remotely from an end client device. As such, the antialiasing engine is able to offload these antialiasing steps onto a server or distributed resources having higher performance than the client device. As can be appreciated, this allows the client device's resources to be allocated to generating the local content and local rendering of a final composition containing the remotely generated content and locally generated content.

Once the client device receives the video stream having the analytical edge of the remote content encoded therein, a client-side antialiasing engine may decode the analytical edge and incorporate the analytical edge into locally generated content. That is, the client-side antialiasing engine may incorporate the analytical edge into rendering techniques executed locally on the client device. For example, the client device may leverage known hybrid rendering depth composition techniques, such as a Multi-Sample Antialiasing (MSAA) technique. In such an example, the client-side antialiasing engine may generate coverage samples based on the analytical edge and use these coverage samples within the MSAA process to determine the extent to which the remotely generated content integrates with locally generated content. The coverage samples allow the MSAA technique to blend colors effectively at the edges of objects, both remotely and locally generated, depending on the depth of the content within the final composition.

The antialiasing engine provided herein provides numerous advantages over conventional antialiasing techniques used for hybrid rendering. For example, the antialiasing engine provided herein generates perceptually stable edges between remotely and locally generated content, mitigating resolution-induced staircase and reprojection induced color-bleeding and edge wobbling. Moreover, the antialiasing engine offloads most, if not all, of the computationally intense workloads to one or more servers thereby minimally impacting the processing power of the client device. That is, the antialiasing engine is able to create stable remote content edges over a local content background without impacting the resource allocations required by the client device to render the final composition. Overall, the antialiasing engine provided herein provides for an improved user experience within MR, AR, and/or VR scenarios by creating an improved overall image quality, reducing visual strain caused by unstable edges between remote content and local content, and enhancing user immersion through smoother transitions and more stable visuals, especially in dynamic environments, all while maintaining low bandwidth and processing requirements for the client device.

Turning now to FIG. 1, FIG. 1 illustrates an operational environment 100 for providing an antialiasing engine, according to an embodiment herein. In particular, the operational environment 100 illustrates a client device 102 using an application service 101 for hybrid content generation, such as within the context of MR, AR, or VR scenarios. As those skilled in the art readily appreciate, hybrid content is generated in both local and remote environments before combining to render a final composition displayed to an end-user. Within the environment 100, hybrid rendering allows the client device 102 to offload part of the content generation to cloud-based services or local servers, such as the application service 101 and one or more respective servers 103 to optimize performance and resource allocation. By leveraging hybrid rendering techniques, the client device 102 ensures that complex graphical computations required for immersive MR, AR, or VR experiences are efficiently distributed between the client device 102 and external resources (e.g., the server(s) 103), improving responsiveness and visual quality of the immersive experience.

To generate hybrid content, the client device 102 communicates with the application service 101 via one or more networks, such as internets, intranets, the Internet, wired and wireless networks, local area networks (LANs), wide area networks (WANs), or any combination thereof. The client device 102 is responsible for generating local content 107, including immediate user interactions, motion tracking, and basic graphical elements. These are tasks that require low latency and real-time responsiveness, ensuring that the user experiences fluid, seamless interaction with the virtual environment. Examples of the client device 102 include personal computers, tablets, mobile phones, gaming consoles, wearable devices, Internet of Things (IoT) devices, and other suitable computing devices, with computing apparatus 1291 in FIG. 12 being broadly representative of these devices.

Simultaneously, more complex content 109 is generated remotely by the application service 101, which employs one or more servers 103 located in a cloud-based environment. These servers 103 host a content generator 104, which is responsible for rendering the remote content 109, which may include large-scale or resource-intensive elements of the experience, such as high-resolution textures, 3D models, or dynamic environmental effects that exceed the computational capacity of the client device 102. The content generator 104 processes this data, creating intricate graphical components, such as the remote content 109, that are transmitted back to the client device 102 in real time.

As the local content 107 is processed on the client device 102, the remote content 109 generated by the servers 103 is streamed to the client device over the network. The client device 102 synchronizes and combines the locally generated content 107 with the remotely generated content 109 to produce a final composition 108. This process typically involves overlaying or integrating remote assets—such as detailed landscapes or high-fidelity models—with locally processed user interactions and simpler environmental objects. The resulting merged content, referred to as the final composition 108, is displayed on the client device 102 through a user interface 106, delivering a seamless, immersive MR, AR, or VR experience to the user. It should be appreciated, that while the illustrated displays represent a personal computer or table, other user interface's 106 suitable for MR, AR, and VR environments (e.g., wearable devices) are similarly contemplated. Throughout this process, the client device 102 handles real-time interactions to ensure smooth performance, while the application service 101 manages the more computationally intensive tasks, benefiting from cloud computing power.

Hybrid rendering, such as illustrated by the environment 100, often relies on depth-based composition techniques commonly used in rasterization-based graphics. In this method, the server 103 via the application service 101 not only sends the color frame of the remote content 109 but also an additional depth frame, allowing the client device 102 to accurately integrate both local content 107 and the remote content 109 based on their relative depth in the scene. However, due to the distributed nature of this approach, latency is introduced during network transmission and processing. To mitigate this, the client device 102 employs reprojection, where previously generated frames are reused while awaiting updated frames from the application service 101. Although reprojection helps address latency, it is not pixel-perfect and can result in undesirable visual artifacts. For example, color leakage may occur between remote content 109 and empty areas of the image (e.g., background) or the local content 107.

As such, one challenge in hybrid rendering is the integration of the remote content 109 with the local content 107, particularly when depth-based composition is involved. Depth reprojection can lead to instability, causing wobbling or shifting edges where the local content 107 and the remote content 109 intersect. This instability arises because the reprojected depth values, like the color values, are not always perfectly aligned, leading to inconsistent rendering of objects over time. Additionally, the quality of the depth frame may degrade due to video compression or sampling errors during transmission between the servers 103 and the client device 102, resulting in a visually unstable experience marked by aliasing artifacts-jagged edges or shimmering effects that degrade the visual quality of the final composition 108.

Furthermore, even when traditional approaches involve conventional antialiasing techniques on the server side to smooth out edges in the remote content 109, the antialiasing effects are often lost during video transmission. That is, under conventional approaches, the subpixel details that enhance visual fidelity are not preserved, contributing to further degradation in the quality of the remote content 109. This discrepancy between the smoothly rendered local content 107 and the artifact-prone remote content 109 creates a perceptual disconnect. Even under optimal conditions with minimal network latency, hybrid rendering may still encounter visual issues due to the complexity of integrating the local content 107 and the remote content 109 in real time. This disconnect is particularly evident in MR, AR, and VR experiences, where maintaining visual continuity and immersion is essential for user engagement.

To address at least some of these and other challenges present in conventional hybrid rendering scenarios, an example antialiasing engine 105 may be leveraged. In particular, the antialiasing engine 105 may be employed to provide smooth integration of the remote content 109 with the local content 107 without impacting the processing requirements of the client device 102. As illustrated, the application service 101 may include an integration with the antialiasing engine 105 to provide stable, visually pleasing remote content 109 edges against the local content 107. In some embodiments, the antialiasing engine 105 may be executed remotely by the application service 101 or a third party, while in other embodiments the antialiasing engine 105 may be installed and executed locally on the client device 102. In still other embodiments, one or more functions of the antialiasing engine 105, as described herein, may be installed and executed locally on the client device 102, while the remaining functions are integrated and executed remotely via the application service 101 or a third party.

As will be expanded on in greater detail below, the antialiasing engine 105 may include a server-side and a client-side. As the remote content 109 is remotely generated by the content generator 104, a server-side antialiasing engine 105 may perform one or more antialiasing processes, such as edge detection and edge tracing, to generate one or more analytical edge(s) for the remote content 109. As described below, the analytical edge(s) of the remote content 109 may refer to a mathematically defined boundary, based on geometric properties such as curves or surfaces, such as a summation or total of individual analytical lines generated by edge tracing, providing a precise and sharp definition of the edge of the remote content 109.

Once generated, the server-side antialiasing engine 105 may encode the analytical edge(s) of the remote content 109 within a video stream. Specifically, the server-side antialiasing engine 105 may encode the analytical edge(s) within a depth frame inside the video stream and transmit the video stream to the client device 102. Responsive to receiving the video stream, the client-side antialiasing engine 105 may decode the analytical edge information from the video stream. As the application executing on the client device 102 combines the remote content 109 with the local content 107, the client-side antialiasing engine 105 may leverage information from the analytical edge(s) during a sampling process, such as an MSAA process, to render the final composition 108. The final composition 108 may be displayed via the user interface 106 of the client device 102 to an end user.

Figure 2:
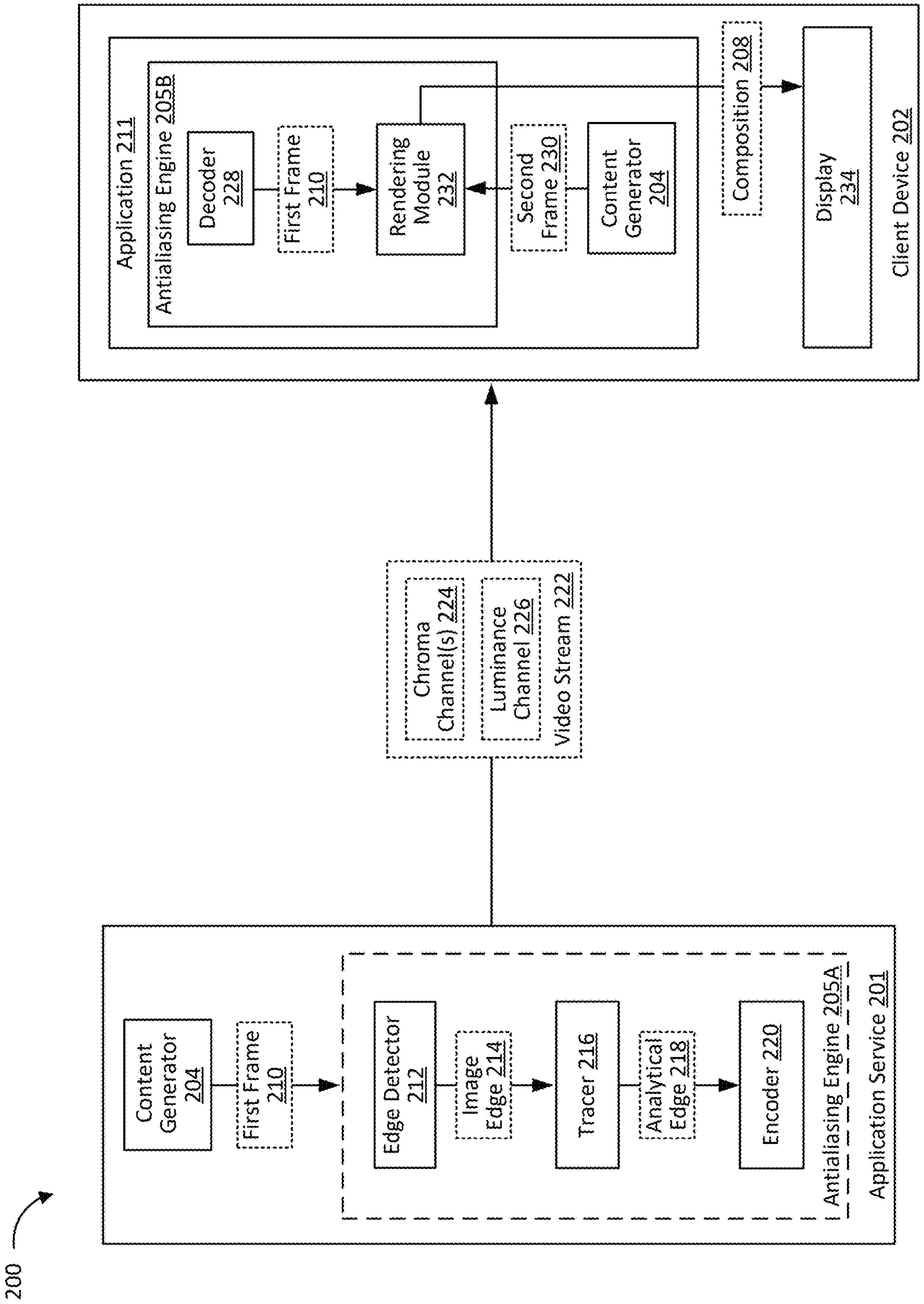
FIG. 2 illustrates an example operational scenario in which an antialiasing engine is provided, according to an embodiment provided herein.
Figure 3:
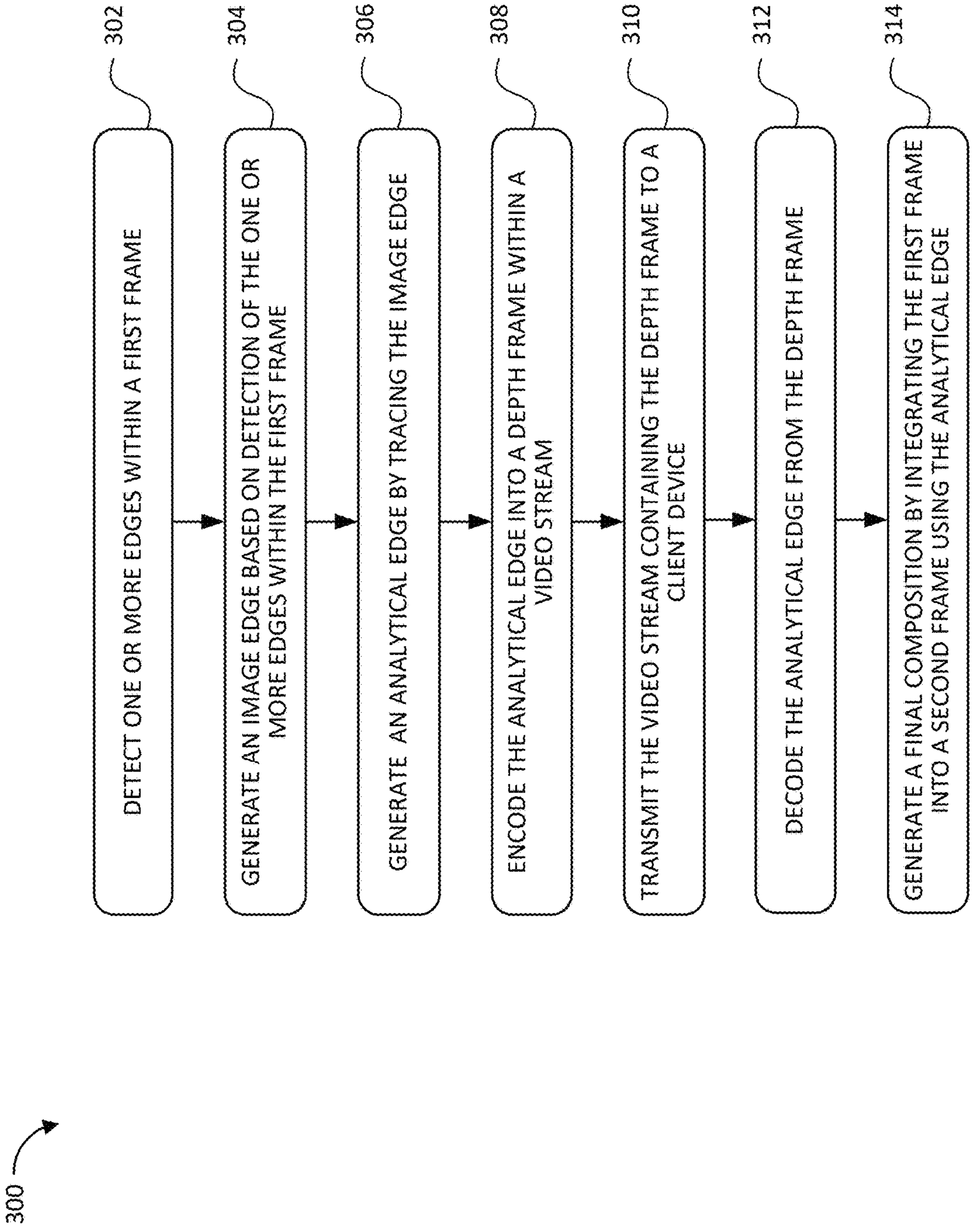
FIG. 3 illustrates a process for providing an antialiasing engine and its related functions, according to an embodiment herein.

Turning now to FIG. 2, FIG. 2 illustrates an example operational scenario 200 in which an antialiasing engine 205A-B is provided, according to an embodiment herein. For case of illustration, FIG. 2 is described with respect to FIG. 3, which provides a process 300 for providing an antialiasing engine and its related functions, such as the antialiasing engine 205A-B, according to an embodiment herein. Although FIG. 3 is described in relation to FIG. 2, it should be appreciated that the process 300 is equally applicable to the remaining Figures and components therein.

As shown, the antialiasing engine of FIG. 2 may include a server-side antialiasing engine 205A and a client-side antialiasing engine 205B. The server-side antialiasing engine 205A may be hosted or in operational communication with an application service 201, which may be the same or similar to the application service 101. In contrast, the client-side antialiasing engine 205B may be hosted or in operational communication with a client device 202, which may be the same or similar to the client device 102. It should be appreciated that any reference to an antialiasing engine, as used herein, unless specified as a client-side or server-side, may refer to one or both of the server-side or client-side antialiasing engine 205A-B, respectively.

In the illustrated scenario, the application service 201 may be a service that provides hybrid renderings for an application executing on the client device 202, such as an AR, MR, or VR experience. As such, the application service 201 may include a content generator 204, which may be the same or similar to the content generator 104, that generates remote content, such as the remote content 109 for the hybrid rendering. The application service 201 may be a cloud-based service that employs one or more servers, such as the servers 103, to host the content generator 104 and/or the server-side antialiasing engine 205A.

Figure 4:
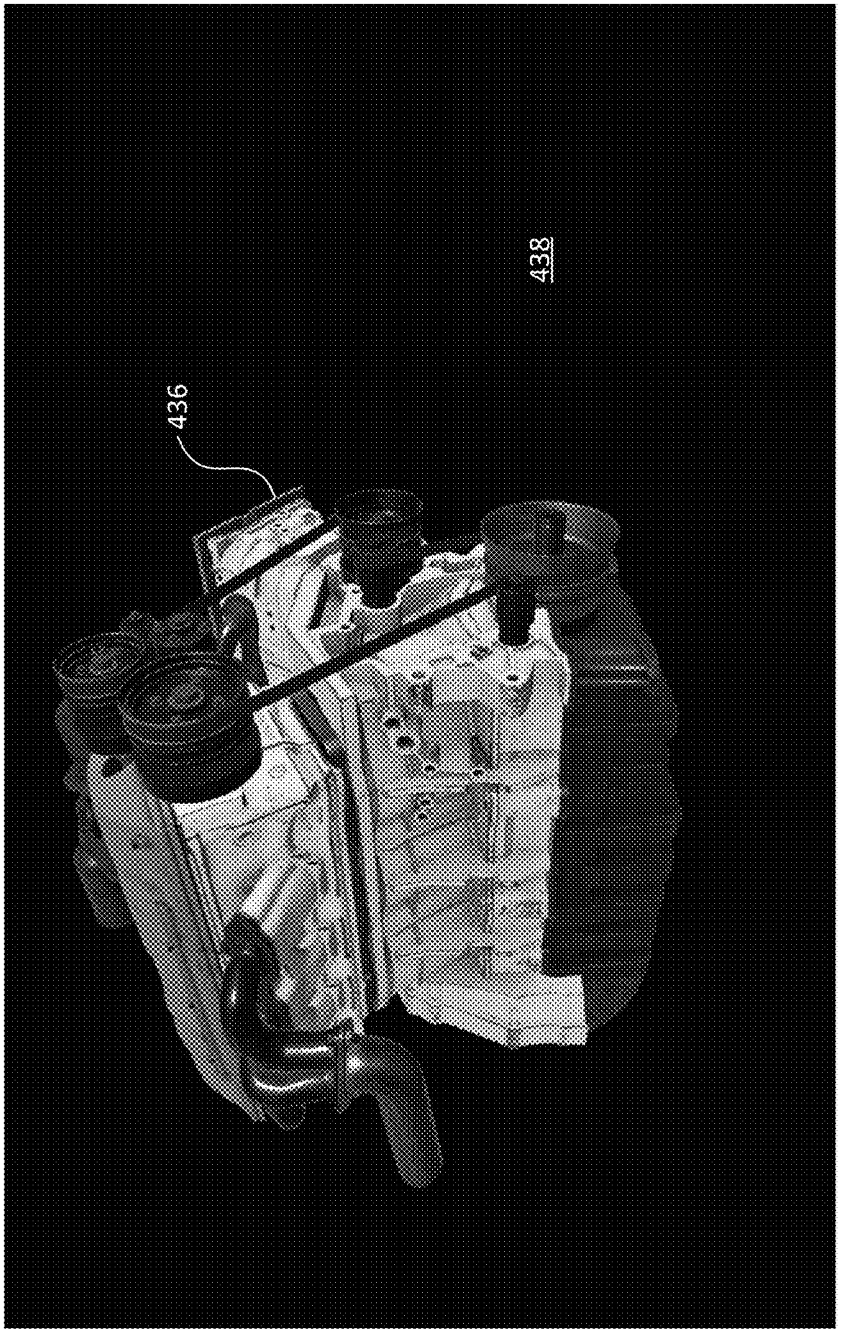
FIG. 4 illustrates an example first frame, according to an embodiment herein.

In the illustrated example, the content generator 104 may generate a first frame 210 of the remote content. The first frame 210 may be a partial image that is generated in real time for the application. Referring now to FIG. 4, an example first frame 410 is illustrated, according to an embodiment herein. The first frame 410 may be remote content that is generated by the content generator 204 as part of a scene within an AR, MR, or VR application executing on the client device 202. As illustrated, the first frame 410 may include a foreground 436 that contains particular remote content and a background 438, which typically consists of an empty image space filled with a uniform color. Depending on how the remote content is integrated into the locally generated content, the background 438 is usually replaced by the local content. The remote content in the foreground 436 is then positioned within the local content based on a predefined depth value, ensuring accurate alignment and occlusion with other objects in the scene, thereby maintaining proper spatial relationships in AR, MR, or VR environments.

As noted above, traditional methods of integrating the foreground 436 content into the locally generated scene often cause unpleasant color leaking and temporally varying depth compositions, perceptible as wobbling edges of the remote content when composed against the local content. Moreover, these conventional techniques often degrade the quality of the remote content due to subpixel detail loss during transmission, resulting in an undesirable disconnect between the remote content and local content when combined.

To address these issues, the server-side antialiasing engine 205A may perform one or more antialiasing steps before the first frame 210 is transmitted to the client device 202. In particular, responsive to receiving the first frame 210, the server-side antialiasing engine 205A may first detect one or more edges of the remote content within the first frame (302). That is, the server-side antialiasing engine 205A may include an edge detector 212 that detects silhouette edges of the foreground 436 content against the background 438 or in some embodiments, detects interior edges present between elements of the foreground 436 content. As used herein, a silhouette edge references to the edges defined between the foreground 436 content against the background 438, while interior edges refers to the edges defined between components of the foreground 436 content. It should be appreciated, that while the following discussion with respect to FIGS. 2-9 focus on silhouette edges, the discussion is equally applicable to interior edges, as described with respect to FIGS. 10-11.

In some embodiments, to perform edge detection, the server-side antialiasing engine 205A applies a Laplacian operator, which leverages the second-order derivative of pixel intensities within the first frame 210 to identify sharp transitions in an image. These transitions, or edges, typically mark the boundaries between different regions within the image, such as the foreground 436 and the background 438. By focusing on areas where the intensity changes rapidly, the server-side antialiasing engine 205A detects the transitions, allowing it to isolate and emphasize the contours of objects within the first frame 210.

To apply the Laplacian operator, the server-side antialiasing engine 205A may select the first frame 210 and apply a Laplacian kernel to it. The Laplacian kernel, a small matrix representing the discrete form of the Laplacian operator, convolves with the pixel values of the image. That is, as the Laplacian kernel moves across the image of the first frame, the Laplacian kernel calculates the second derivative of intensity values, detecting areas of high contrast that signal the presence of edges. In some embodiments, the server-side antialiasing engine 205A first generates a depth image, such as described below with respect to FIG. 5A, and then the Laplacian kernel is applied to the depth image.

The Laplacian kernel may be predefined based on the specific requirements of the image processing task, such as edge detection. These kernels are designed to calculate the second derivative of pixel intensities, which helps to identify areas of rapid intensity change, marking the edges in an image. The edge detector 212 may be or include the appropriate Laplacian kernel depending on the characteristics of the image and the level of detail needed. For example, a standard 3×3 Laplacian kernel is predefined to capture edges in both the horizontal and vertical directions by emphasizing intensity differences between a pixel and its surrounding neighbors. An example Laplacian kernel is as follows:

$$\begin{bmatrix} -1 & -1 & -1 \\ -1 & 8 & -1 \\ -1 & -1 & -1 \end{bmatrix}$$

To compute a convolution value for each pixel, the server-side antialiasing engine 205A applies the Laplacian kernel in a convolution process. That is, for every pixel in the first frame 210, the server-side antialiasing engine 205A centers the Laplacian kernel on that pixel and multiplies the Laplacian kernel's predefined values by the corresponding pixel intensities in the neighborhood. The server-side antialiasing engine 205A then sums these products to produce a convolution value for the central pixel. The convolution value reflects the rate of intensity change at that location, highlighting the presence of an edge if the change is significant. By applying this Laplacian kernel across the entire first frame 210, the server-side antialiasing engine 205A efficiently identifies edges while suppressing regions of uniform intensity.

Figure 5B:
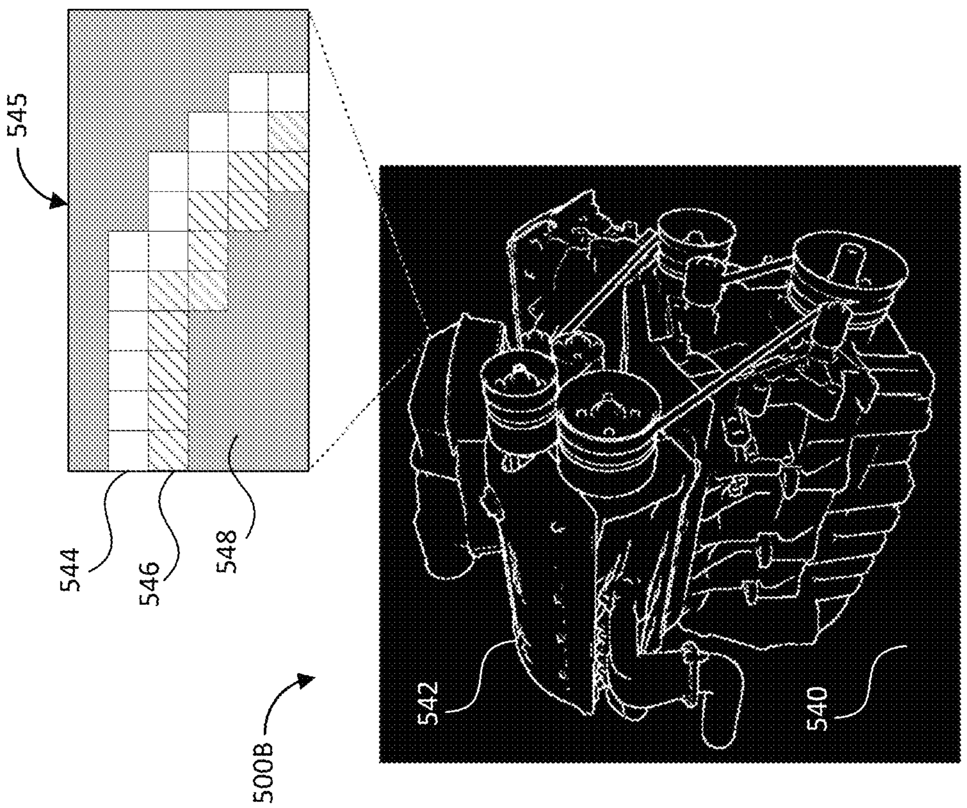
FIGS. 5A and 5B illustrate an example depth image and an example edge image generated from the first frame of FIG. 4, according to an embodiment herein.
Figure 5A:
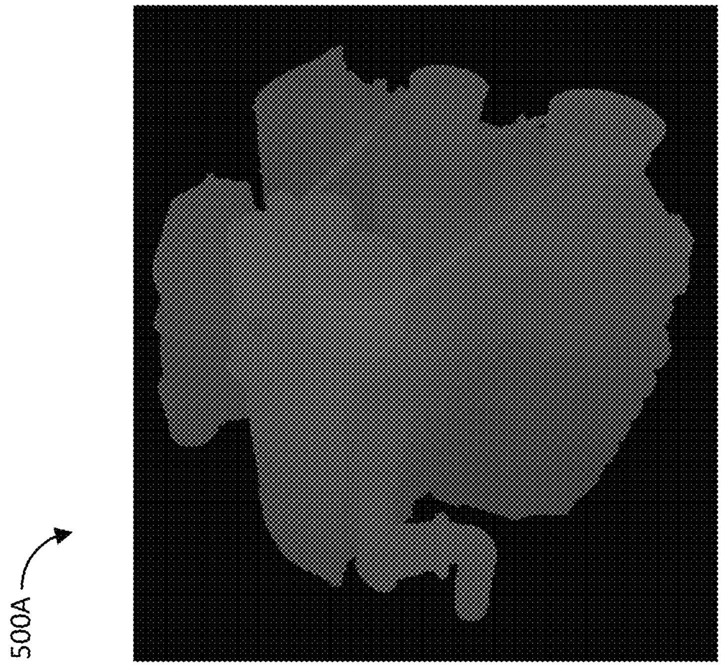

Responsive to detecting the edges, the server-side antialiasing engine 205A repeats this process for each pixel to generate an edge image 214 (304). The edge image 214 may include or accentuate only the regions with sharp transitions in intensity within the first frame 210. Referring now to FIGS. 5A and 5B, a depth image 500A and an edge image 500B of the first frame from FIG. 4 are illustrated, according to an embodiment herein. That is, the depth image 500A and the edge image 500B may be generated based on the first frame 410.

In some embodiments, the application service 201 generates a depth frame, such as the depth image 500A based on the first frame 210/410. Within the depth image 500A each pixel represents the distance between the camera and the objects within the scene. Unlike a typical image that contains color or intensity values, the depth image 500A encodes spatial information, with closer objects having lower pixel values and farther objects having higher values. This depth information allows the application service 201 to understand the spatial relationships between objects, which is essential for applications like 3D rendering, object recognition, AR, MR, and VR. As will be described in greater detail below, by analyzing the depth image 500A, the application service 201 can accurately position virtual elements, such as the remote content, in a scene, ensuring that these elements interact properly with real-world objects in terms of scale and occlusion, providing a more realistic and immersive experience. Fundamentally, the depth image 500A is also a prerequisite of depth-based composition in hybrid rendering scenarios, where the contents of the first frame may need to be composed together with the contents of a second frame in a desired depth order.

The edge image 500B may be generated based on the depth image 500A. For example, the server-side antialiasing engine 205A applies the Laplacian kernel to the depth image 500A to generate the edge image 500B. By applying the Laplacian kernel to each pixel in the depth image 500A, the server-side antialiasing engine 205A isolates the regions 542 where the most significant intensity transitions occur, while suppressing the regions 540 of uniform intensity. As shown, resulting edge image 500B emphasizes the contours of objects, thereby indicating the edges clearly from the surrounding content.

In some embodiments, the convolution values generated for each pixel after application of the Laplacian operator are normalized to a magnitude of 1. For example, pixels bordering on the edge image 500B in the background (e.g., closer to the region 540) may be normalized to −1, while pixels bordering the edge image 500B in the foreground may be normalized to 1. Finally, pixels with no edge within a respective pixel neighborhood may be normalized to 0. As used herein, a pixel neighborhood refers to a group of surrounding pixels adjacent to a specific pixel within an image or frame. Typically, a pixel neighborhood is defined by a matrix (such as 3×3 or 5×5) that encompasses a respective pixel and its immediate neighbors. Examples of normalized convolution values are illustrated and discussed in greater detail below with respect to FIGS. 6A-D, 7A-B, and 8.

As shown by perspective 545 on FIG. 5B, using the edge image 500B is based on the convolution values generated for each pixel. For example, the white boxes 544 represent convolution values indicating that the respective pixels border a background, such as the region 540. In contrast, the shaded boxes 546 represent convolution values indicating that the respective pixels border the foreground. And the grey 548 represents convolution values indicating that the respective pixels border neither the foreground nor the background. Since the Laplacian operator is applied to the entire first frame 210, the resulting convolution values generate the edge image 500B.

Returning now to FIG. 2, once the edge image 214, which may be the same or similar to the edge image 500B, is generated for the first frame 210, the server-side antialiasing engine 205A may generate an analytical edge 218 based on the edge image 214 (306). That is, the server-side antialiasing engine 205A may include a tracer 216 that traces the edge image 214 to generate the analytical edge 218.

Referring now to FIGS. 6A-D, an example edge tracing operation is illustrated, according to an embodiment herein. Each of the FIGS. 6A-D depicts the same portion 600 of the edge from the edge image 500B. As such, each box within each portion 600 includes a convolution value for the respective pixel. The convolution value may have been generated by applying the Laplacian kernel to the pixel. Additionally, the convolution values illustrated in each portion 600 are normalized to a magnitude of 1 such that "0" indicates a pixel that is not bordering the foreground or background, "−1" indicates a pixel is bordering the background, and "1" indicates that a pixel is bordering the foreground. As such, any pixels having a convolution value of "−1" that are contacting or are physically proximate to a pixel having a convolution value of "1" indicate the edge.

Figure 6B:
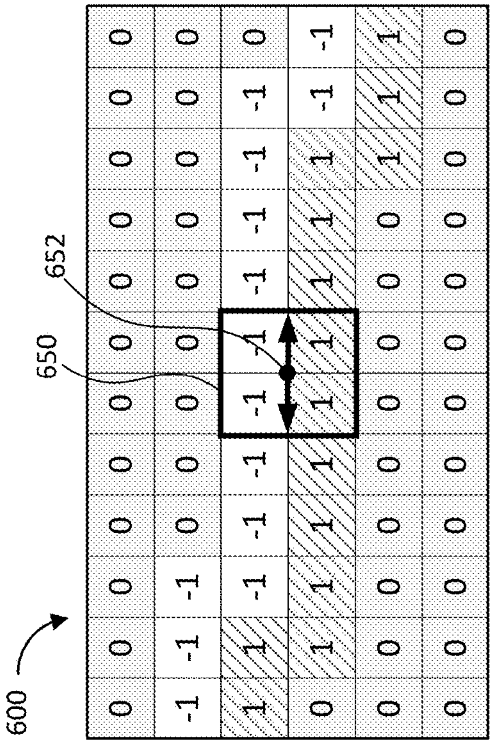
FIGS. 6A-D illustrate an example edge tracing operation, according to an embodiment herein.
Figure 6A:
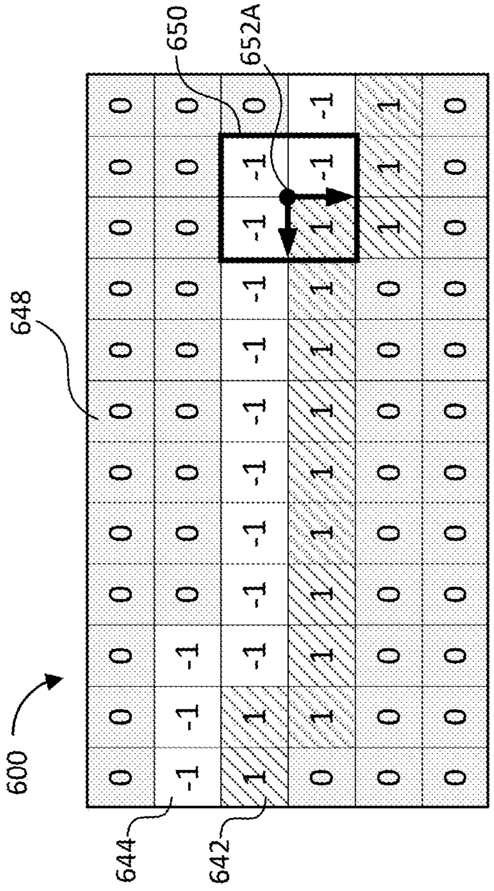
Figure 6D:
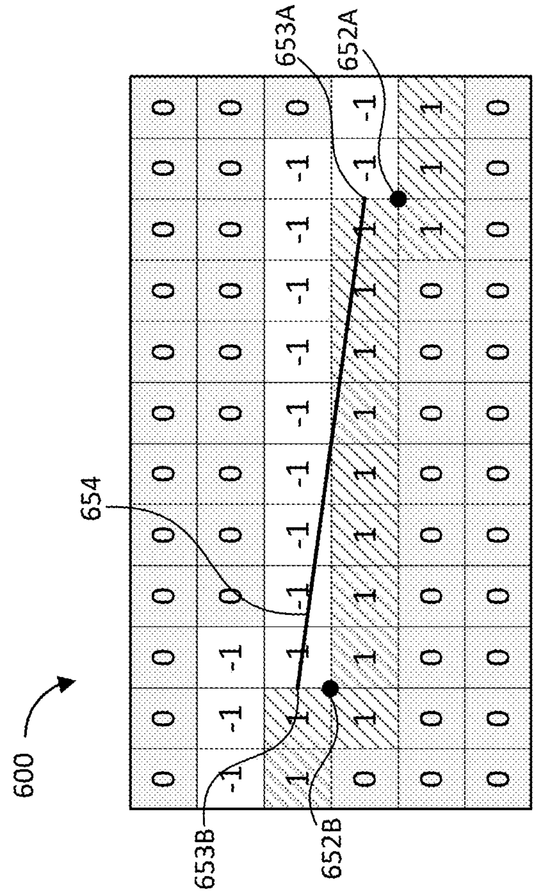
Figure 6C:
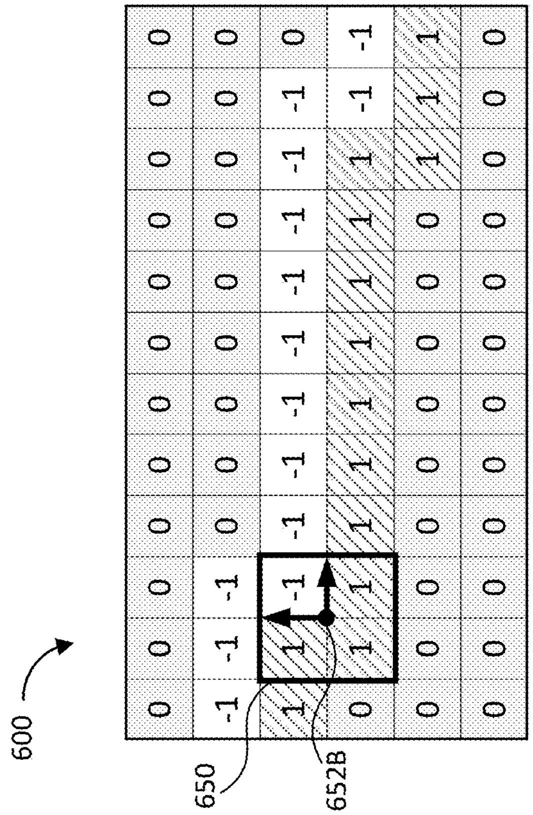

To trace an edge, the antialiasing engine 205A may analyze a pixel region 650 having a central point 652 to analyze a neighborhood of pixels. Here, the neighborhood of pixels is a 2×2 region of pixels, however it should be appreciated that a pixel neighborhood may contain any number of pixels within a selected region. The server-side antialiasing engine 205A may iteratively advance the pixel region 650 along an edge defined by adjacent pixels with opposing convolution values (e.g., −1, 1) until a termination edge or specific criteria is met. In other words, tracer 216 may iteratively analyze the pixel region 650 as it progresses from a starting edge 652A in a tracing direction until a termination edge 652B is detected. FIGS. 6A-6C illustrate the movement of the pixel region 650 along this tracing direction, starting from the starting edge 652A and continuing to the termination edge 652B. As shown, the convolution values within the pixel region 650 determine both the starting and termination edges, as well as the type of tracing that dictates the tracing direction. For instance, FIGS. 6A-6D demonstrate horizontal tracing, where the pixel region 650 moves consistently in the tracing direction until it encounters a cross direction, such as at termination edge 652B.

Once the starting edge 652A and the termination edge 652B are detected, the tracer 216 may generate an analytical line 654 approximating the boundary formed between the opposing convolution values (e.g., −1,1). A starting point 653A of the analytical line 654 and the termination point 653B of the analytical line 654 may vary depending on the shape of the detected edge. As illustrated in FIG. 6D, the starting point 653A and ending point 653B of the analytical line 654 differ from the starting edge 652A and the termination edge 652B. However, as will be illustrated below in FIG. 7C, in some cases, the starting point and the ending point of a respective analytical line may correspond to the starting edge and termination edge detected by the tracer 216.

Once the entirety of the edge image 500B is traced and an analytical line 654 generated for each segment, a combination of the analytical lines for each segment forms the analytical edge 218. In other words, the analytical edge 218 may be an approximation of the edge image 500B based on tracing the convolution values of the respective pixels. In some embodiments, to generate the analytical edge 218 the tracer 216 may perform a variety of tracing types, such as horizontal tracing, vertical tracing, and diagonal tracing.

Figure 7B:
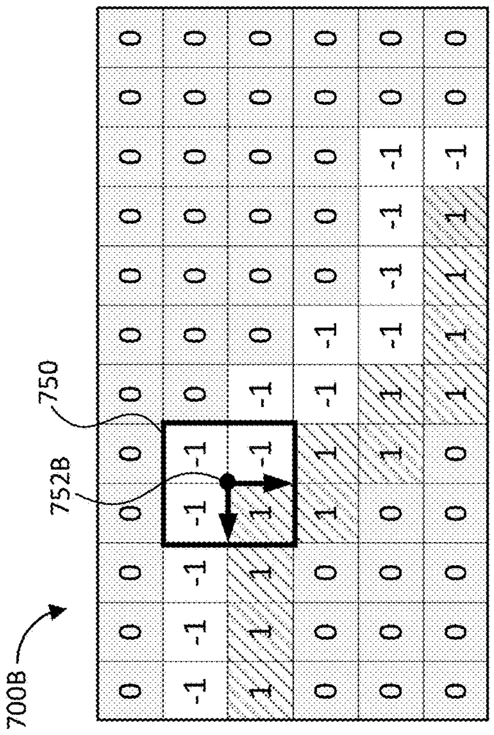
FIGS. 7A-C illustrate an example diagonal tracing operation, according to an embodiment herein.
Figure 7A:
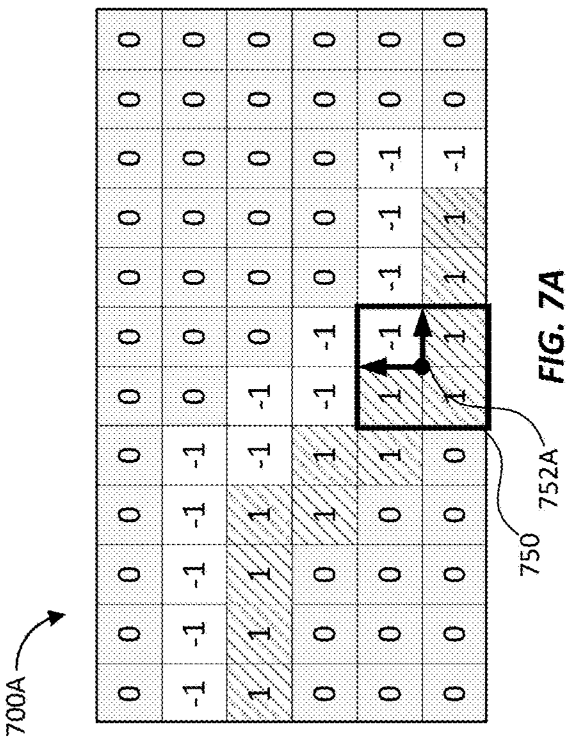
Figure 7C:
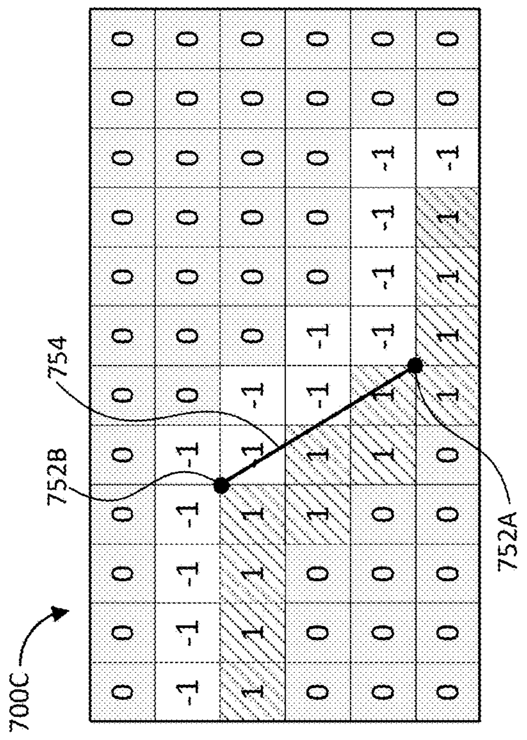

FIGS. 7A-7C illustrate an example diagonal tracing operation, according to an embodiment herein. As shown, in the case of diagonal tracing, a pixel region 750 starts at a starting edge 752A and moves along an edge where adjacent pixels form a diagonal pattern based on their convolution values. Similar to horizontal tracing, the pixel region 750 follows the path defined by these opposing values (e.g., −1, 1), but instead of moving strictly horizontally or vertically, the tracing direction shifts diagonally. As the pixel region 750 moves diagonally, it continuously evaluates the convolution values within the region to determine if the path should continue or if a termination edge 752B is reached. This diagonal movement proceeds until a cross direction is detected, such as when the convolution values indicate a shift away from the diagonal path, signaling the presence of the termination edge 752B, which is similar to the termination edge 652B in the horizontal case. Once the starting edge 752A and the termination edge 752B are detected for a particular tracing step, the tracer 216 generates an analytical line 754. The analytical line 754 may be combined with the analytical line 654, as well as other analytical lines, to generate the analytical edge 218 of the first frame 210.

Returning now to FIG. 2, once the analytical edge 218 is generated, the server-side antialiasing engine 205A may encode the analytical edge 218 into a video stream 222 for transmission to the client device 202 (308). In particular, the server-side antialiasing engine 205A may include an encoder 220 that encodes the analytical edge into a depth frame or video buffer within the video stream 222. To encode the analytical edge into the video stream 222, the encoder 220 may determine a distance field, and in some embodiments, an angle field for each pixel or neighborhood of pixels of the analytical edge 218.

Figure 8:
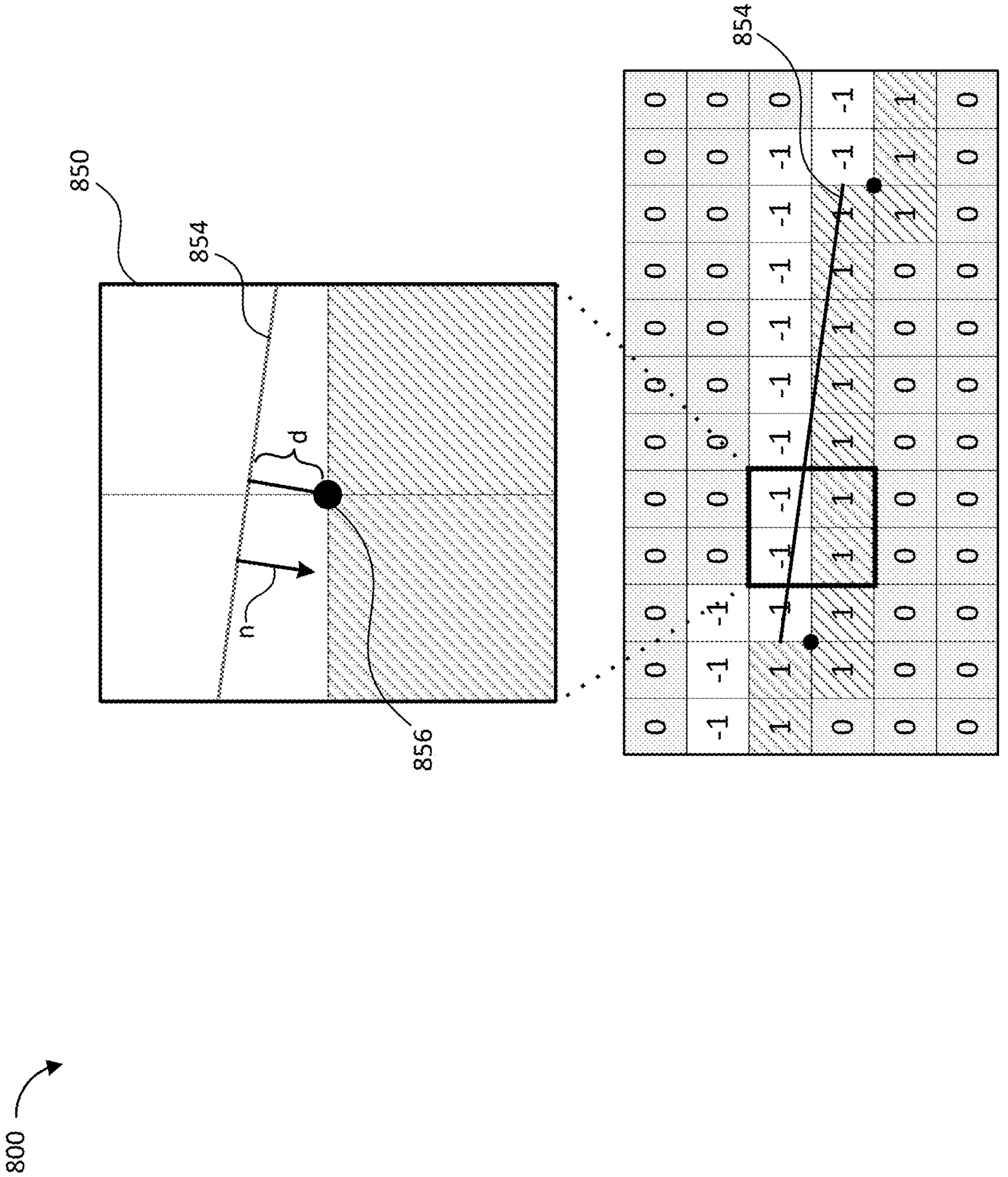
FIG. 8 illustrates an example encoding operation, according to an embodiment herein.

Referring now to FIG. 8, an example encoding operation 800 is illustrated, according to an embodiment herein. As shown, the encoding operation 800 is for a pixel region 850 along an analytical line 854 having a central point 856. The analytical line 854 may be a segment of the analytical edge 218 generated in the above described steps. The pixel region 850 is a 2×2 pixel region along the edge and as such contains 4 total pixels. Since the analytical edge 218 contains multiple analytical lines, such as the analytical line 854 containing a starting edge and a termination edge, the encoder 220 converts these start and termination positions of the analytical line 854 into a localized standard normal line form. The encoder 220 may use the following equation to compute an indefinite analytical line in local space of the pixel region 850:

$$n \cdot x - d = 0,$$

where:

- n is a normal vector perpendicular to the analytical line's 854 direction and oriented from the background region into the foreground region;
- d is a distance scalar with a known maximum magnitude that is calculated by the equation: $d=(p-c)\cdot n$, with p is a point on the analytical line 854, and c is the central point 856 for the pixel region 850; and
- x is an arbitrary local point with respect to the pixel region 850.

Once the indefinite analytical line is computed by the encoder 220 for the pixel region 850, the encoder 220 may convert the normal vector on a per pixel region 850 basis and convert the normal vector to a scalar polar coordinate (e.g., an angle in the unit circle with a range of [0,2 π]). This is referred to herein as an angle field. The distance values, d, per pixel region 850 are referred to herein as a distance field. In some embodiments, the encoder 220 may clamp the distance field to a scalar range of [$\sqrt{-2}$; $\sqrt{2}$]. From there, the encoder 220 may map the distance field, and in some cases, the angle field to a byte value range of [0;255]. That is, in some embodiments the first frame 210 may be a final quarter resolution image and as such the encoder 220 may quantize the distance field, and optionally, the angle field to an unsigned byte range of [0;255] and store this edge information (e.g., distance field and optionally angle field) into a depth frame within the video stream 222.

The encoder 220 may compute the distance field and/or the normal vector based on the type of transmission via which the video stream 222 is transmitted. In one embodiment, for full resolution depth frame space, the edge information may be packed into a luminance channel 226 of the video stream 222. This packing may be advantageous in terms of quality, as the luminance channel 226 provides better preservation by video encoding. However, a drawback of encoding into the luminance channel 226 is that the actual depth image must be resampled to create room for the edge information, thereby losing detail.

In another embodiment, the encoder 220 may encode the edge information into one or more of the chroma channels 224 of the video stream 222. As those skilled in the art readily appreciate, the chroma channels 224 may be at quarter resolution for a typical 4:2:0 luma-chroma video format. As such, encoding the edge information into one or more of the chroma channels 224 allows for the depth frame to preserve full resolution. However, encoding into the chroma channels 224 may cause degradation of the quality of the edge information since the chroma channels 224 are less precisely retained by the video encoding.

With reference to FIG. 2, once the edge information is encoded into the video stream 222, the video stream 222 may be transmitted to the client device 202 (310). Specifically, the video stream 222 may be transmitted to an application 211 executing on the client device 202. The application 211 may be a local application corresponding to the application being executed by the application service 201 to generate the first frame 210. In other words, in the context of hybrid rendering for an AR environment, the application 211 may be the client-side application that generates local content, such as the local content 107, and integrates local content with received remote content to render a final composition that is provided to an end user. In the illustrated example, the application 211 includes the content generator 204 that generates a second frame 230, which may be part of the locally generated content.

As illustrated, the application 211 includes or is otherwise in operable communication with the client-side antialiasing engine 205B. As the video stream 222 is received, in real-time, the client-side antialiasing engine 205B may decode the edge information and recreate the first frame 210 for integration with the locally generated content. That is, the client-side antialiasing engine 205B may decode the edge information or analytical edge from the video stream 222 (312) and integrate the edge information with the second frame 230 to render a final composition 208.

To access the edge information encoded in the video stream 222, the client-side antialiasing engine 205B may include a decoder 228. The decoder 228 accesses the edge information from the depth frame within the video stream 222 by inverting the byte range encoding, as described above. When the edge information is encoded as distance fields and angle fields, the decoder 228 may fetch a respective pixel region's angle and distance from the depth video frame and subsequently recompute the indefinite analytical line, using the equation provided above.

Once the edge information is decoded from the video stream 222, a rendering module 232 may integrate the first frame 210 with the locally generated second frame 230 to render the final composition 208 (312). To integrate the first frame 210 with the second frame, the rendering module 232 decodes the indefinite analytical line using the edge information and generates coverage samples by sampling the analytical lines at a desired rate. In the embodiments where the encoding only includes the distance field, the rendering module 232 generates the coverage samples by bilinearly sampling the distance field at each sample position.

The rendering module 232 may determine a coverage sample's distance to the analytical line by decoding the analytical line from the received edge information or sampling the distance field bilinearly at the coverage sample's position. The rendering module 232 may consider the coverage sample as foreground when the sampled distance field is greater or equal to zero and consider the sample as background when the sample distance field is less than zero. If a coverage sample is in the foreground region, then its coverage mask bit is set to one. Otherwise, the coverage sample is not considered as covered and the coverage mask bit is left as zero. In some embodiments, the generated coverage samples may be integrated into the application's 211 sampling process, which may include an MSAA technique. The analytical edge can be sampled from the edge information decoded from the video stream 222 at any rate such that the sampling process is not limited by image resolution.

Figure 9:
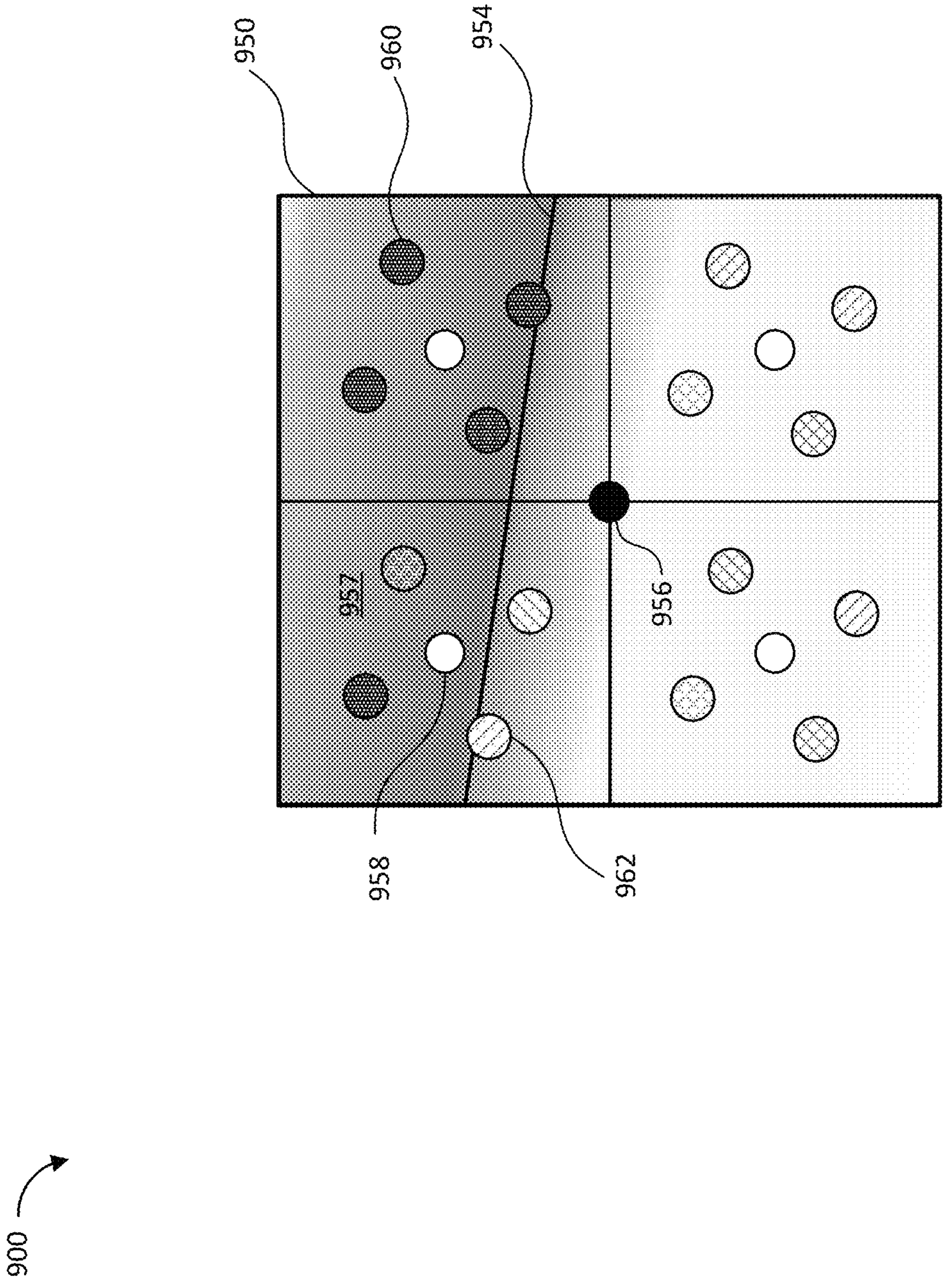
FIG. 9 illustrates an example sampling operation, according to an embodiment herein.

Referring now to FIG. 9, an example sampling operation 900 is illustrated, according to an embodiment herein. As illustrated by FIG. 9, for a given pixel region 950, four coverage samples are generated by the rendering module 232 per individual target pixel 958, indicated by the white circles. The coverage samples are generated by sampling the analytical edge 954 using the edge information. Based on the analytical edge 954, and respective edge information, the decoder 228 determines that samples 960 (dark shaded circles) are in the background and the samples 962 (hashed circles) are in the foreground. Sampling the analytical edge 954 may be performed using the distance field and angle field based on the central point 956 within the pixel region 950. In some cases, if the rendering module 232 only samples the distance field, which is represented as a gradient 957 indicating the coverage of each respective sample based on respective distance values. In some embodiments, the rendering module 232 may perform a multi-sampling process, such as MSAA to generate the coverage samples.

Using the edge information, the antialiasing engine 205A, on the server side, can detect regions that are completely in the background and mark them as such by assigning a maximum negative distance field. Having a maximum negative distance field indicates that the pixel region is fully outside the edge in a non-covered space. Analogously, regions which the antialiasing engine 205A may detect as fully in the foreground can be assigned maximum positive distance. As such, the edges within the final composition 208 may be perfectly stable as the edge's positioning is not dependent on the resolution of the edge information.

Figure 10:
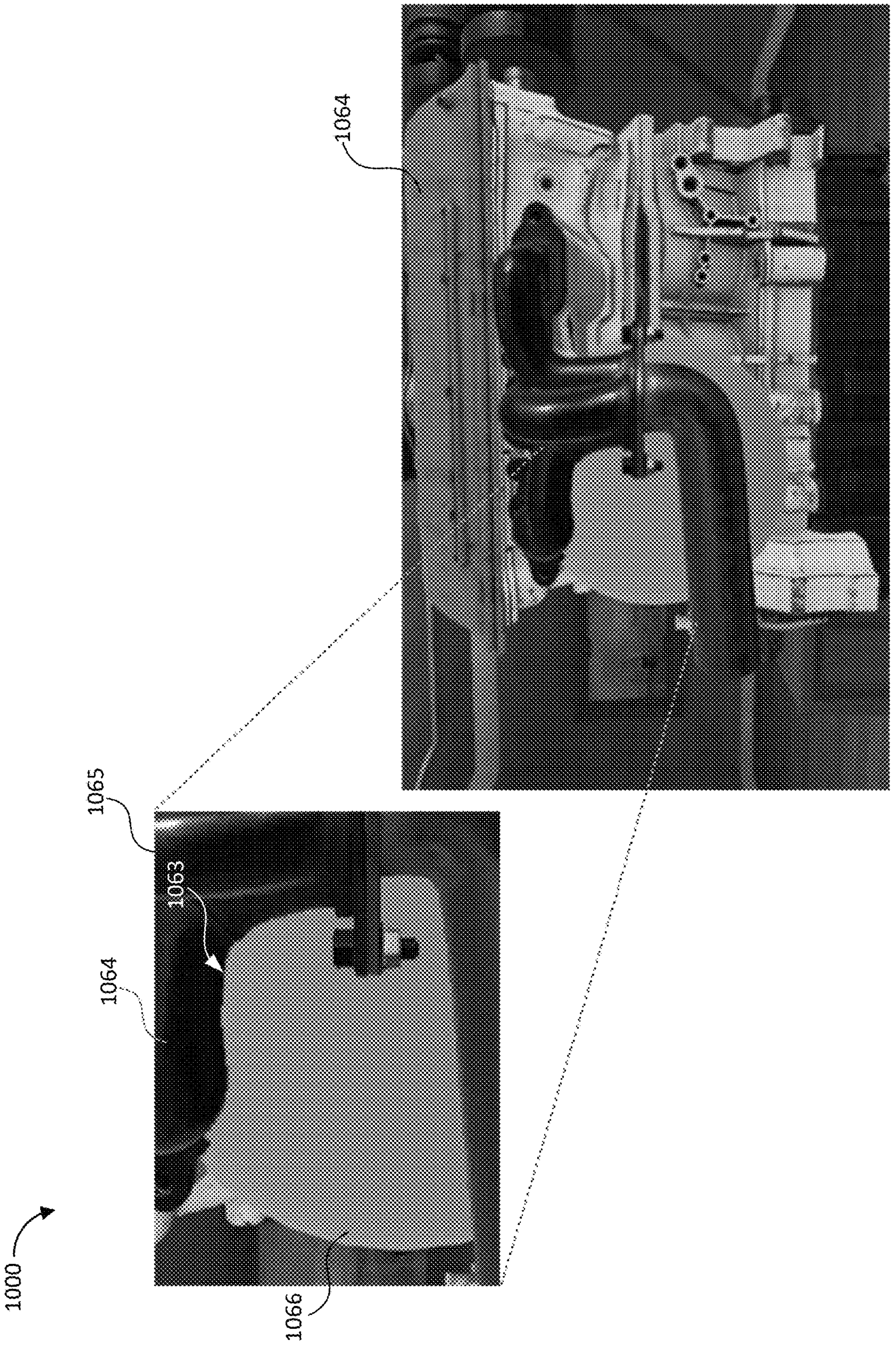
FIG. 10 illustrates an example composition containing interior edges, according to an embodiment herein.

As noted above, in some embodiments, the antialiasing engine 205 may detect interior edges and generate an analytical edge representing the interior edges present within the first frame 210. Referring now to FIG. 10, an example composition 1000 containing interior edges 1063 is illustrated, according to an embodiment herein. The composition 1000 may be a final composition, such as the composition 208, meaning that it contains remotely generated content integrated into locally generated content. For example, the content 1064 may be remotely generated, however, within the final composition 1000, local content 1066 may be positioned within the context of the content 1064. As shown by the close-up perspective 1065, the interior edges 1063 of the content 1066 are contrasted against the local content 1066, which under conventional techniques risk aliasing, shimmering, and wobbling, as described above with respect to the silhouette examples.

For interior edges 1063, the same or similar steps as for silhouette edges may be performed by the server-side antialiasing engine 205A. That is, the server-side antialiasing engine 205A may generate an edge image, such as the edge image 500B, containing both the silhouette edges and interior edges 1063. Then the server-side antialiasing engine 205A may trace the interior edges 1063 using the same techniques described above to generate an analytical edge, which is subsequently encoded and transmitted to the client device 202. In some embodiments, the server-side antialiasing engine 205A generates and transmits edge information for both the silhouette edges and interior edges 1063.

On the client side, when the edge information for interior edges 1063 is received, the antialiasing engine 205B may generate the foreground samples and background samples. That is, unlike silhouette edges which only require the rendering module 232 to generate coverage samples for the foreground, for interior edges 1063, the rendering module 232 may additionally generate samples for the background.

Figure 11:
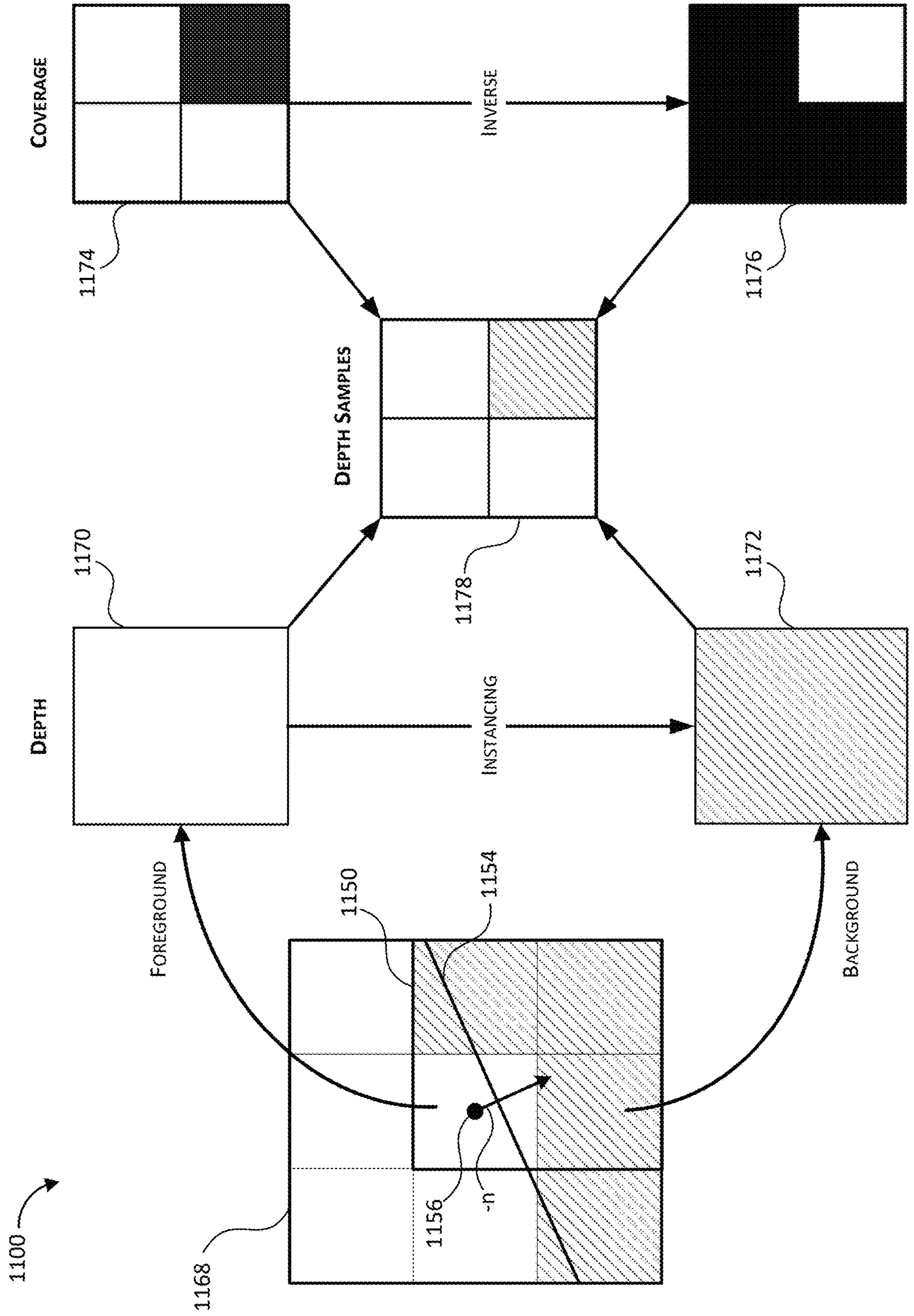
FIG. 11 illustrates an example sampling process for interior edges, according to an embodiment herein.

Referring now to FIG. 11, an example sampling process 1100 for interior edges is illustrated, according to an embodiment herein. As shown by the process 1100, for a pixel region 1150, the foreground is sampled for a respective pixel 1156 as described above based on the edge information for an analytical edge 1154. As those skilled in the art readily appreciate, the sampling process may generate a depth value 1170 and a coverage mask 1174. To sample the background, the rendering module 232 may perform a depth stealing process to determine an appropriate background depth value 1172. That is, the depth value 1172 for the background may be determined based on a pixel neighbor opposing the current pixel region 1150 on the analytical edge 1154. For the coverage sample 1176 of the background, an inverse coverage mask is generated based on the coverage mask 1174 generated based on foreground. From there, the depth coverage sample 1178 is generated for the pixel region 1150.

Returning now to FIG. 2, once the final composition 208 is generated, the client-side antialiasing engine 205B, via the application 211 may provide the composition 208 to a display 234 on the client device 202. As can be appreciated, while the above discussion focuses on a single frame, content may be continuously generated for an immersive experience. Accordingly, one or more of the above steps may be performed in real-time, particularly for AR, MR, and/or VR applications. By generating smooth and visually seamless transitions between remotely and locally generated content, the antialiasing engine 205A-B maintains the immersive quality of the experience, thereby ensuring that users are not disrupted by visual inconsistencies, enhancing realism and fluidity in interactive environments. Moreover, the antialiasing engine 205A-B achieves these improvements while maintaining low bandwidth requirements and low processing requirements on the client side.

Figure 12:
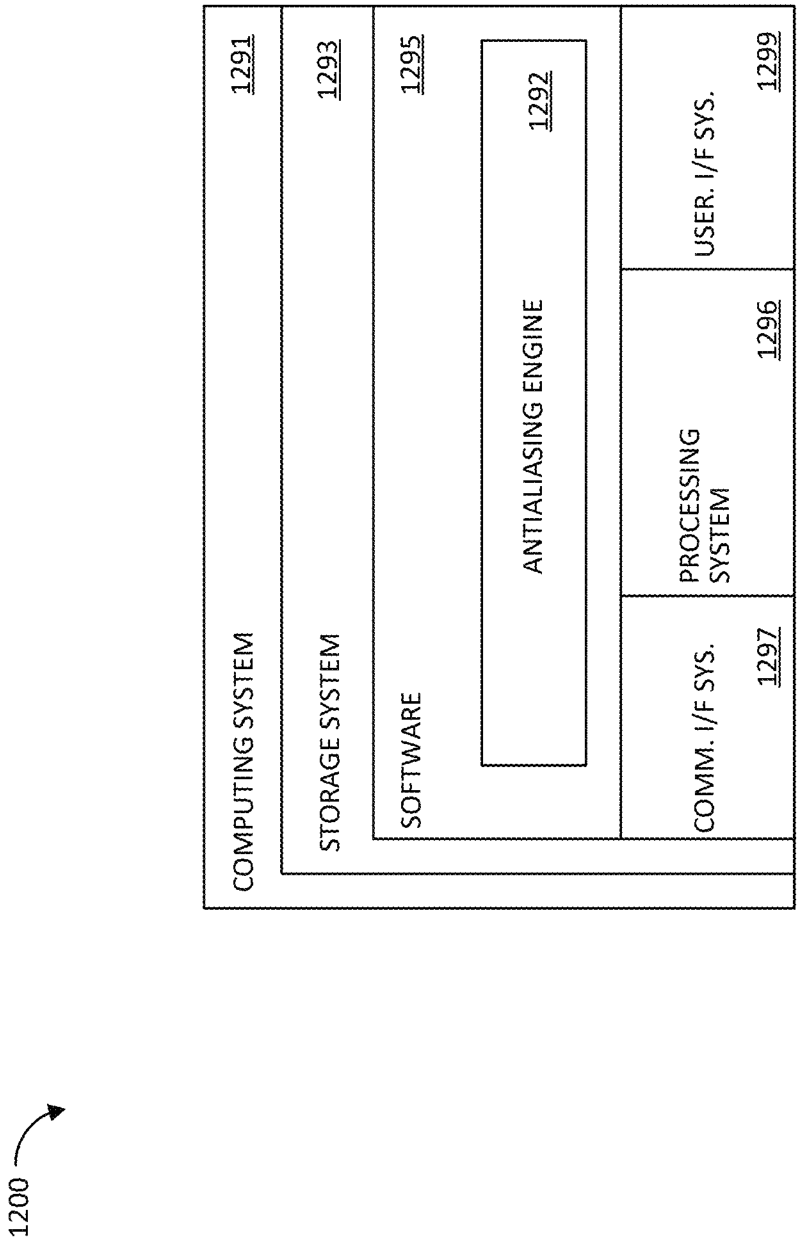
FIG. 12 shows an example client device suitable for providing an antialiasing engine and related functions, according to an embodiment herein.

Referring to FIG. 12, FIG. 12 illustrates a computing apparatus 1291 that may be used for providing an antialiasing engine and related functions, as described herein. For example, the client device 102 or 202 may be or include the computing apparatus 1291. As illustrated, the computing apparatus 1291 includes a processing system 1292 that includes a microprocessor and other circuitry that retrieves and executes software 1295 from storage system 1293. The processing system 1292 may be implemented within a single processing device but may also be distributed across multiple processing devices or sub-systems that cooperate in executing program instructions. Examples of the processing system 1292 include general purpose central processing units, graphical processing units, application specific processors, and logic devices, as well as any other type of processing device, combinations, or variations thereof.

The storage system 1293 may comprise any computer-readable storage media or medium readable by processing system 1292 and capable of storing software 1295. The storage system 1293 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 1293 may also include computer readable communication media over which at least some of the software 1295 may be communicated internally or externally. The storage system 1293 may be implemented as a single storage device but may also be implemented across multiple storage devices or sub-systems co-located or distributed relative to each other. The storage system 1293 may comprise additional elements, such as a controller capable of communicating with the processing system 1292 or possibly other systems.

The software 1295 (including antialiasing engine process 1296) may be implemented in program instructions and among other functions may, when executed by the processing system 1292, direct the processing system 1292 to operate as described with respect to the various operational scenarios, sequences, and processes illustrated herein. For example, the software 1295 may include program instructions for implementing an antialiasing engine and related functions, such as the process 300, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 1295 may include additional processes, programs, or components, such as operating system software, virtualization software, or other application software. The software 1295 may also comprise firmware or some other form of machine-readable processing instructions executable by the processing system 1292.

In general, the software 1295 may, when loaded into the processing system 1292 and executed, transform a suitable apparatus, system, or device (of which computing apparatus 1291 is representative) overall from a general-purpose computing system into a special-purpose computing system customized to generate features, functionality, and user experiences provided by the antialiasing engine. Indeed, encoding the software 1295 on the storage system 1293 may transform the physical structure of the storage system 1293. The specific transformation of the physical structure may depend on various factors in different implementations of this description. Examples of such factors may include, but are not limited to, the technology used to implement the storage media of the storage system 1293 and whether the computer-storage media are characterized as primary or secondary storage, as well as other factors.

For example, if the computer readable storage media are implemented as semiconductor-based memory, the software 1295 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1297 may include communication connections and devices that allow for communication with other computing systems (not shown) over communication networks (not shown). Examples of connections and devices that together allow for inter-system communication may include network interface cards, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing apparatus 1291 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as programmable logic controllers (PLCs), programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing an antialiasing engine and related functions. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words. A or B or C includes any or all of the following alternative combinations as appropriate for a particular usage: A alone; B alone; C alone; A and B only; A and C only: B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; an antialiasing engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: detect one or more edges within a first frame, wherein the first frame comprises a foreground and a background; generate an edge image based on detection of the one or more edges within the first frame, wherein the edge image indicates a respective pixel's proximity to the foreground or the background within the first frame; generate an analytical edge by tracing the edge image; encode the analytical edge into a depth frame within a video stream; and transmit, the video stream to a client device, wherein responsive to receiving the video stream, a client-side antialiasing engine: samples the depth frame from the video stream to reconstruct the analytical edge; and generates a final composition by integrating the first frame into a second frame using the analytical edge, where the second frame is generated by the client device.

Example 2 is the computing apparatus of any previous or subsequent Example, wherein the processor-executable instructions to generate the edge image based on detection of the one or more edges within the first frame, when executed by the one or more processors, further direct the computing apparatus to: apply a Laplacian kernel to the one or more edges within the first frame; generate an edge image comprising a plurality of pixels based on the Laplacian kernel, wherein: each pixel within the edge image corresponds to a convolution value generated by applying the Laplacian kernel to the first frame; and the convolution value indicates a rate of intensity change with respect to a neighborhood of pixels proximate to the respective pixel.

Example 3 is the computing apparatus of any previous or subsequent Example, wherein: the edge image comprises a plurality of pixels, wherein each pixel of the plurality of pixels comprises a respective convolution value that indicates a rate of intensity change with respect to a neighborhood of pixels proximate to the respective pixel; and the processor-executable instructions to generate the analytical edge by tracing the edge image, when executed by the one or more processors, further direct the computing apparatus to: iteratively generate a pixel region based on a plurality of convolution values for a set of respective pixels based on a position within the edge image to generate a plurality of pixel regions indicating an edge between a foreground and background pixels; determine a local pixel edge shape based on the plurality of pixel regions; and estimate the analytical edge based on the local pixel edge shape.

Example 4 is the computing apparatus of any previous or subsequent Example, wherein the processor-executable instructions to encode the analytical edge into the depth frame within the video stream, when executed by the one or more processors, further direct the computing apparatus to: generate an analytical line in local space within a respective pixel region; generate a distance field based on the analytical line in local space for the respective pixel region; and encode the distance field into the depth frame of at least one of a luminance channel or a chroma channel within the video stream.

Example 5 is the computing apparatus of any previous or subsequent Example, wherein the processor-executable instructions to detect the one or more edges within the first frame, when executed by the one or more processors, further direct the computing apparatus to: detect a plurality of silhouette edges within the first frame; and detect a plurality of interior edges within the first frame, wherein the one or more edges comprise the plurality of silhouette edges and a plurality of interior edges.

Example 6 is the computing apparatus of any previous or subsequent Example, wherein the processor-executable instructions to encode the analytical edge into the depth frame within the video stream, when executed by the one or more processors, further direct the computing apparatus to: encode the analytical edge into the depth frame contained within at least one of: a luminance channel within the video stream; or one or more chroma channels within the video stream.

Example 7 is a method for distributed morphological antialiasing, the method comprising: detecting, by a server-side antialiasing engine, one or more edges within a first frame, wherein the first frame comprises a foreground and a background; generating, by the server-side antialiasing engine, an edge image based on detection of the one or more edges within the first frame, wherein the edge image indicates a respective pixel's proximity to the foreground or the background within the first frame; generating, by the server-side antialiasing engine, an analytical edge by tracing the edge image; encoding, by the server-side antialiasing engine, a video stream with the analytical edge; and transmitting, by the server-side antialiasing engine, the video stream to a client-side antialiasing engine executing on a client device; decoding, by the client-side antialiasing engine, the analytical edge from the video stream responsive to receiving the video stream; and generating, by the client-side antialiasing engine, a final composition by integrating the first frame into a second frame using the analytical edge, wherein the second frame is generated by the client device.

Example 8 is the method of any previous or subsequent Example, wherein generating, by the server-side antialiasing engine, the edge image based on detection of the one or more edges within the first frame comprises: performing, by the server-side antialiasing engine, a Laplace operation on the first frame to generate the edge image, wherein: the edge image comprises a plurality of pixels; each pixel comprising a corresponding convolution value generated by the Laplace operation; and a respective convolution value indicates a corresponding pixel's proximity to the background and the foreground within the first frame.

Example 9 is the method of any previous or subsequent Example, wherein the method further comprises: normalizing, by the server-side antialiasing engine, the convolution values of the edge image to a magnitude of 1.

Example 10 is the method of any previous or subsequent Example, wherein generating, by the server-side antialiasing engine, the analytical edge by tracing the edge image comprises: estimating, by the server-side antialiasing engine, the analytical edge based on the convolution values of the edge image.

Example 11 is the method of any previous or subsequent Example, wherein encoding, by the server-side antialiasing engine, the video stream with the analytical edge comprises: generating, by the server-side antialiasing engine, an analytical line in local space within a respective pixel region; generating, by the server-side antialiasing engine, a distance field and an angle field based on the analytical line in local space for the respective pixel region; and encoding, by the server-side antialiasing engine, the distance field within a depth frame and the angle field within the depth frame of the video stream.

Example 12 is the method of any previous or subsequent Example, wherein generating, by the client-side antialiasing engine, the final composition by integrating the analytical edge from the first frame into the second frame generated by the client device comprises: sampling, by the client-side antialiasing engine, the analytical edge to reconstruct the first frame; and integrating, by the client-side antialiasing engine, the analytical edge with the second frame to render the final composition based on the sample, wherein the second frame comprises locally generated content.

Example 13 is the method of any previous or subsequent Example, wherein the one or more edges comprise one or more interior edges within the first frame, and generating, by the client-side antialiasing engine, the final composition by integrating the analytical edge from the first frame into the second frame generated by the client device comprises: generating, by the client-side antialiasing engine, a coverage sampling based on the analytical edge; reconstructing, by the client-side antialiasing engine, the foreground based on the coverage sampling; and reconstructing, by the client-side antialiasing engine, the background by depth sampling across the analytical edge.

Example 14 is the method of any previous or subsequent Example, wherein the one or more edges comprise one or more interior edges within the first frame, and generating, by the client-side antialiasing engine, the final composition by integrating the analytical edge from the first frame into the second frame generated by the client device comprises: generating, by the client-side antialiasing engine, a coverage sampling based on the analytical edge; generating, by the client-side antialiasing engine, an inverse coverage sampling based on the coverage sampling and a respective background depth value; and reconstructing, by the client-side antialiasing engine, the one or more interior edges based on the coverage sampling and the inverse coverage sampling.

Example 15 is a computer readable storage media comprising processor-executable instructions configured to cause one or more processors to: detect, by a server-side antialiasing engine, one or more edges within a first frame, wherein the first frame comprises a foreground and a background; generate, by the server-side antialiasing engine, an edge image based on detection of the one or more edges within the first frame, wherein the edge image indicates a respective pixel's proximity to the foreground or the background within the first frame; generate, by the server-side antialiasing engine, an analytical edge by tracing the edge image; encode, by the server-side antialiasing engine, the analytical edge into a depth frame within a video stream; and transmit, by the server-side antialiasing engine, the video stream to a client-side antialiasing engine executing on a client device, wherein responsive to receiving the video stream the client-side antialiasing engine: decodes the analytical edge from depth frame of the video stream responsive to receiving the video stream; and performs a multi-sample antialiasing (MSAA) process to incorporate the analytical edge into a second frame generated locally on the client device; and generate a final composition based on the MSAA process, wherein the final composition combines the first frame with the second frame.

Example 16 is the computer readable storage media of any previous or subsequent Example, wherein the processor-executable instructions to generate, by the server-side antialiasing engine, the edge image based on detection of the one or more edges within the first frame cause the one or more processors to further execute processor-executable instructions stored in the computer readable storage media to: apply, by the server-side antialiasing engine, a Laplace kernel to a depth frame corresponding to the first frame; and generate, by the server-side antialiasing engine, the edge image comprising a plurality of pixels and a plurality of corresponding convolution values, wherein each convolution value of the plurality of convolution values indicates a respective pixel's proximity to an edge within the depth frame.

Example 17 is the computer readable storage media of any previous or subsequent Example, wherein the processor-executable instructions to generate, by the server-side antialiasing engine, the analytical edge by tracing the edge image cause the one or more processors to further execute processor-executable instructions stored in the computer readable storage media to: generate, by the server-side antialiasing engine, a pixel region based on the edge image, wherein the pixel region comprises a set of convolution values for a set of respective pixels based on a position within the edge image; trace, by the server-side antialiasing engine, the one or more edges based on the set of convolution values; and estimate, by the server-side antialiasing engine, a local analytical edge in local space of a respective pixel region based on the tracing of the one or more edges.

Example 18 is the computer readable storage media of any previous or subsequent Example, wherein the processor-executable instructions to trace, by the server-side antialiasing engine, the one or more edges based on the set of convolution values cause the one or more processors to further execute processor-executable instructions stored in the computer readable storage media to: iteratively fetch, by the server-side antialiasing engine, a local pixel region's convolution values; trace, by the server-side antialiasing engine, along a tracing direction within the edge image based on each local pixel region's convolution values; and determine, by the server-side antialiasing engine, a termination edge along the tracing direction; and determine, by the server-side antialiasing engine, the analytical edge based on a starting point and a termination point of the tracing.

Example 19 is the computer readable storage media of any previous or subsequent Example, wherein the processor-executable instructions to encode, by the server-side antialiasing engine, the analytical edge into the depth frame within the video stream with cause the one or more processors to further execute processor-executable instructions stored in the computer readable storage media to: generate, by the server-side antialiasing engine, an analytical line in local space within a respective pixel region; generate, by the server-side antialiasing engine, a distance field based on the analytical line in local space for the respective pixel region; and encode, by the server-side antialiasing engine, the distance field into a video depth frame of the video stream.

Example 20 is the computer readable storage media of any previous or subsequent Example, wherein the one or more edges comprise one or more of: a plurality of silhouette edges; or a plurality of interior edges.

What is claimed is:

1. A computing apparatus comprising:

a computer-readable storage medium;

an antialiasing engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

detect one or more edges within a first frame, wherein the first frame comprises a foreground and a background;

generate an edge image based on detection of the one or more edges within the first frame, wherein the edge image indicates a respective pixel's proximity to the foreground or the background within the first frame;

generate an analytical edge by tracing the edge image;

encode the analytical edge into a depth frame within a video stream; and transmit the video stream to a client device, wherein responsive to receiving the video stream, a client-side antialiasing engine:

samples the depth frame from the video stream to reconstruct the analytical edge; and generates a final composition by integrating the first frame into a second frame using the analytical edge, wherein the second frame is generated by the client device.

2. The computing apparatus of claim 1, wherein the processor-executable instructions to generate the edge image based on detection of the one or more edges within the first frame, when executed by the one or more processors, further direct the computing apparatus to:

apply a Laplacian kernel to the one or more edges within the first frame;

generate an edge image comprising a plurality of pixels based on the Laplacian kernel, wherein:

each pixel within the edge image corresponds to a convolution value generated by applying the Laplacian kernel to the first frame; and the convolution value indicates a rate of intensity change with respect to a neighborhood of pixels proximate to the respective pixel.

3. The computing apparatus of claim 1, wherein:

the edge image comprises a plurality of pixels, wherein each pixel of the plurality of pixels comprises a respective convolution value that indicates a rate of intensity change with respect to a neighborhood of pixels proximate to the respective pixel; and the processor-executable instructions to generate the analytical edge by tracing the edge image, when executed by the one or more processors, further direct the computing apparatus to:

iteratively generate a pixel region based on a plurality of convolution values for a set of respective pixels based on a position within the edge image to generate a plurality of pixel regions indicating an edge between a foreground and background pixels;

determine a local pixel edge shape based on the plurality of pixel regions; and estimate the analytical edge based on the local pixel edge shape.

4. The computing apparatus of claim 1, wherein the processor-executable instructions to encode the analytical edge into the depth frame within the video stream, when executed by the one or more processors, further direct the computing apparatus to:

generate an analytical line in local space within a respective pixel region;

generate a distance field based on the analytical line in local space for the respective pixel region; and encode the distance field into the depth frame of at least one of a luminance channel or a chroma channel within the video stream.

5. The computing apparatus of claim 1, wherein the processor-executable instructions to detect the one or more edges within the first frame, when executed by the one or more processors, further direct the computing apparatus to:

detect a plurality of silhouette edges within the first frame; and detect a plurality of interior edges within the first frame, wherein the one or more edges comprise the plurality of silhouette edges and a plurality of interior edges.

6. The computing apparatus of claim 1, wherein the processor-executable instructions to encode the analytical edge into the depth frame within the video stream, when executed by the one or more processors, further direct the computing apparatus to:

encode the analytical edge into the depth frame contained within at least one of:

a luminance channel within the video stream; or one or more chroma channels within the video stream.

7. A method for distributed morphological antialiasing, the method comprising:

detecting, by a server-side antialiasing engine, one or more edges within a first frame, wherein the first frame comprises a foreground and a background;

generating, by the server-side antialiasing engine, an edge image based on detection of the one or more edges within the first frame, wherein the edge image indicates a respective pixel's proximity to the foreground or the background within the first frame;

generating, by the server-side antialiasing engine, an analytical edge by tracing the edge image;

encoding, by the server-side antialiasing engine, a video stream with the analytical edge; and transmitting, by the server-side antialiasing engine, the video stream to a client-side antialiasing engine executing on a client device;

decoding, by the client-side antialiasing engine, the analytical edge from the video stream responsive to receiving the video stream; and generating, by the client-side antialiasing engine, a final composition by integrating the first frame into a second frame using the analytical edge, wherein the second frame is generated by the client device.

8. The method of claim 7, wherein generating, by the server-side antialiasing engine, the edge image based on detection of the one or more edges within the first frame comprises:

performing, by the server-side antialiasing engine, a Laplace operation on the first frame to generate the edge image, wherein:

the edge image comprises a plurality of pixels;

each pixel comprising a corresponding convolution value generated by the Laplace operation; and a respective convolution value indicates a corresponding pixel's proximity to the background and the foreground within the first frame.

9. The method of claim 8, wherein the method further comprises:

normalizing, by the server-side antialiasing engine, the convolution values of the edge image to a magnitude of 1.

10. The method of claim 8, wherein generating, by the server-side antialiasing engine, the analytical edge by tracing the edge image comprises:

estimating, by the server-side antialiasing engine, the analytical edge based on the convolution values of the edge image.

11. The method of claim 7, wherein encoding, by the server-side antialiasing engine, the video stream with the analytical edge comprises:

generating, by the server-side antialiasing engine, an analytical line in local space within a respective pixel region;

generating, by the server-side antialiasing engine, a distance field and an angle field based on the analytical line in local space for the respective pixel region; and encoding, by the server-side antialiasing engine, the distance field within a depth frame and the angle field within the depth frame of the video stream.

12. The method of claim 7, wherein generating, by the client-side antialiasing engine, the final composition by integrating the analytical edge from the first frame into the second frame generated by the client device comprises:

sampling, by the client-side antialiasing engine, the analytical edge to reconstruct the first frame; and integrating, by the client-side antialiasing engine, the analytical edge with the second frame to render the final composition based on the sample, wherein the second frame comprises locally generated content.

13. The method of claim 7, wherein the one or more edges comprise one or more interior edges within the first frame, and generating, by the client-side antialiasing engine, the final composition by integrating the analytical edge from the first frame into the second frame generated by the client device comprises:

generating, by the client-side antialiasing engine, a coverage sampling based on the analytical edge;

reconstructing, by the client-side antialiasing engine, the foreground based on the coverage sampling; and reconstructing, by the client-side antialiasing engine, the background by depth sampling across the analytical edge.

14. The method of claim 7, wherein the one or more edges comprise one or more interior edges within the first frame, and generating, by the client-side antialiasing engine, the final composition by integrating the analytical edge from the first frame into the second frame generated by the client device comprises:

generating, by the client-side antialiasing engine, a coverage sampling based on the analytical edge;

generating, by the client-side antialiasing engine, an inverse coverage sampling based on the coverage sampling and a respective background depth value; and reconstructing, by the client-side antialiasing engine, the one or more interior edges based on the coverage sampling and the inverse coverage sampling.

15. A computer readable storage media comprising processor-executable instructions configured to cause one or more processors to:

detect, by a server-side antialiasing engine, one or more edges within a first frame, wherein the first frame comprises a foreground and a background;

generate, by the server-side antialiasing engine, an edge image based on detection of the one or more edges within the first frame, wherein the edge image indicates a respective pixel's proximity to the foreground or the background within the first frame;

generate, by the server-side antialiasing engine, an analytical edge by tracing the edge image;

encode, by the server-side antialiasing engine, the analytical edge into a depth frame within a video stream; and transmit, by the server-side antialiasing engine, the video stream to a client-side antialiasing engine executing on a client device, wherein responsive to receiving the video stream the client-side antialiasing engine:

decodes the analytical edge from depth frame of the video stream responsive to receiving the video stream; and performs a multi-sample antialiasing (MSAA) process to incorporate the analytical edge into a second frame generated locally on the client device; and generate a final composition based on the MSAA process, wherein the final composition combines the first frame with the second frame.

16. The computer readable storage media of claim 15, wherein the processor-executable instructions to generate, by the server-side antialiasing engine, the edge image based on detection of the one or more edges within the first frame cause the one or more processors to further execute processor-executable instructions stored in the computer readable storage media to:

apply, by the server-side antialiasing engine, a Laplace kernel to a depth frame corresponding to the first frame; and generate, by the server-side antialiasing engine, the edge image comprising a plurality of pixels and a plurality of corresponding convolution values, wherein each convolution value of the plurality of convolution values indicates a respective pixel's proximity to an edge within the depth frame.

17. The computer readable storage media of claim 15, wherein the processor-executable instructions to generate, by the server-side antialiasing engine, the analytical edge by tracing the edge image cause the one or more processors to further execute processor-executable instructions stored in the computer readable storage media to:

generate, by the server-side antialiasing engine, a pixel region based on the edge image, wherein the pixel region comprises a set of convolution values for a set of respective pixels based on a position within the edge image;

trace, by the server-side antialiasing engine, the one or more edges based on the set of convolution values; and estimate, by the server-side antialiasing engine, a local analytical edge in local space of a respective pixel region based on the tracing of the one or more edges.

18. The computer readable storage media of claim 17, wherein the processor-executable instructions to trace, by the server-side antialiasing engine, the one or more edges based on the set of convolution values cause the one or more processors to further execute processor-executable instructions stored in the computer readable storage media to:

iteratively fetch, by the server-side antialiasing engine, a local pixel region's convolution values;

trace, by the server-side antialiasing engine, along a tracing direction within the edge image based on each local pixel region's convolution values; and determine, by the server-side antialiasing engine, a termination edge along the tracing direction; and determine, by the server-side antialiasing engine, the analytical edge based on a starting point and a termination point of the tracing.

19. The computer readable storage media of claim 15, wherein the processor-executable instructions to encode, by the server-side antialiasing engine, the analytical edge into the depth frame within the video stream with the analytical edge cause the one or more processors to further execute processor-executable instructions stored in the computer readable storage media to:

generate, by the server-side antialiasing engine, an analytical line in local space within a respective pixel region;

generate, by the server-side antialiasing engine, a distance field based on the analytical line in local space for the respective pixel region; and encode, by the server-side antialiasing engine, the distance field into a video depth frame of the video stream.

20. The computer readable storage media of claim 15, wherein the one or more edges comprise one or more of:

a plurality of silhouette edges; or a plurality of interior edges.

* * * * *